(12) United States Patent
Higbee et al.

(10) Patent No.: US 11,601,450 B1
(45) Date of Patent: *Mar. 7, 2023

(54) SUSPICIOUS MESSAGE REPORT PROCESSING AND THREAT RESPONSE

(71) Applicant: Cofense Inc, Leesburg, VA (US)

(72) Inventors: Aaron Higbee, Leesburg, VA (US); Rohyt Belani, New York, NY (US); Scott Greaux, Glenmont, NY (US); William Galway, Scotch Plains, NJ (US); Douglas Hagen, Amherst, NY (US)

(73) Assignee: Cofense Inc, Leesburg, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/498,588

(22) Filed: Oct. 11, 2021

Related U.S. Application Data

(63) Continuation of application No. 16/532,449, filed on Aug. 5, 2019, now Pat. No. 11,146,575, which is a continuation of application No. 16/418,973, filed on May 21, 2019, now Pat. No. 10,375,093, which is a continuation of application No. 15/905,784, filed on Feb. 26, 2018, now Pat. No. 10,298,602, which is a continuation-in-part of application No. 15/584,002, filed on May 1, 2017, now Pat. No. 9,906,554, which (Continued)

(51) Int. Cl.
| | |
|---|---|
| *H04L 9/40* | (2022.01) |
| *G06F 16/35* | (2019.01) |
| *G06F 21/55* | (2013.01) |
| *G06F 21/00* | (2013.01) |
| *H04L 51/212* | (2022.01) |
| *H04L 51/08* | (2022.01) |

(52) U.S. Cl.
CPC ........ *H04L 63/1416* (2013.01); *G06F 16/35* (2019.01); *G06F 21/00* (2013.01); *G06F 21/554* (2013.01); *H04L 51/212* (2022.05); *H04L 63/1433* (2013.01); *H04L 63/1483* (2013.01); *H04L 63/1491* (2013.01); *H04L 63/20* (2013.01); *H04L 51/08* (2013.01)

(58) Field of Classification Search
CPC ............ H04L 63/1483; H04L 63/1433; H04L 63/1416; H04L 63/1441; H04L 63/1425; H04L 63/20; H04L 63/145; H04L 63/08; H04L 63/1466; H04L 63/1408; H04L 63/062; H04L 63/14; H04L 63/0263; H04L 63/1491; H04L 51/12; H04L 51/08; H04L 65/1076; G06F 16/35; G06F 21/55; G06F 21/577; G06F 21/554; G06F 21/53; G06F 21/00; G06F 17/5009; G06F 2221/2119; H04W 12/12; H04W 12/00522; G06Q 20/4016
See application file for complete search history.

(56) References Cited

U.S. PATENT DOCUMENTS

| | | | |
|---|---|---|---|
| 2005/0060643 A1* | 3/2005 | Glass | H04L 51/212 715/205 |
| 2014/0230030 A1* | 8/2014 | Abhyanker | G06F 16/9537 707/743 |

OTHER PUBLICATIONS

McAfee SaaS Email Protection, McAfee, pp. 1-4. (Year: 2014).*

* cited by examiner

*Primary Examiner* — Brian F Shaw

(57) ABSTRACT

The present invention relates to methods, network devices, and machine-readable media for an integrated environment for automated processing of reports of suspicious messages, and furthermore, to a network for distributing information about detected phishing attacks.

29 Claims, 19 Drawing Sheets

Related U.S. Application Data is a continuation of application No. 14/986,515, filed on Dec. 31, 2015, now Pat. No. 9,906,539.

(60) Provisional application No. 62/145,778, filed on Apr. 10, 2015.

| From | Subject | Report Phishing |
|---|---|---|
| Text | Meet me in my office | ☐ |
| john@suspicious.com | Suspicious | ☑ |
| hr@company.com | Upcoming Staff Wellness Programs | ☐ |

510

520

1100

Cluster Summary

1130 — Create Rule from Cluster

| To | From | Subject | Received | Reported | Reporter Score | Matches | Severity |
|----|------|---------|----------|----------|----------------|---------|----------|
|    |      |         |          |          | 88             | 1, 4, 8, 14 | 0 |
|    |      |         |          |          | 79             | 1, 4, 8, 14 | 0 |

1110  1112                                    1115
                                       1114

1120

| Summary | Headers | Text Body | URLs |

1121       1124                                       1150

Received:

Reported:

Internal: No

Category: Uncategorized

Matches: Rule1, Rule 4, Rule 8, Rule 14

Subject: [SPAM] Overdue Payment

From:

To:

Originating IP: redcoat.plus.com

SMTP Relay: redcoat.plus.com

Rule Creator

Name: _____ ~1310

Description: _____

Severity: [High ▼]
         Medium
         Low    ~1320

Tags: _____

Text
Active: ☑    Match Against: [Against Attachment ▼]
                             Against Email
Share                                          ~1340
Anonymously? ☑

Content: _____ ~1330

Rule Creator

Name: ⟶ 1310

Description:

Severity: [High ▽ / Medium / Low] ⟵ 1320

Tags:

Active: ☑    Match Against: Text [Against Attachment ▽ / Against Email] ⟵ 1340

Share Anonymously? ☑

Content:
```
strings:
    $subject = "Suspicious Email"
    $from = "test@suspicious.com" nocase condition:
    $subject and $from
```
⟵ 1430

FIG. 14

| # | From | Subject | Last Received | Last Reported | Credibility Score 1510 | Match Severity | Counts 1530 | Rule Matches 1520 |
|---|---|---|---|---|---|---|---|---|
| 1 | x@phish.com | Phishing | 12/1/2015 | 12/1/2015 | 23 | 3 | 0 | 7,13,18 |
| 2 | x@phish.com | Download ThiS! | 10/4/2015 | 10/30/2015 | 17 | 2 | 1 | 7,18,24 |
| 1 | hr@comp.com | HR Report | 10/29/2015 | 11/5/2015 | 937 | 1 | 0 | 1 |

Recipe Creation

Name: _____ 1610

Description: _____ 1620

Category*
| Non-Malicious ▽ |
| Spam |
| Crimeware |
| Advanced Threats |

Status*
| Active ▽ |
| Inactive |
↙ 1630

Rule Matches [New Rule]
☐ Rule 1
☐ Rule 2
☐ Rule 3
⟶ 1650

Actions:

○ No response will be sent

◉ Send a response to the reporter <u>Create Response</u>

[Thank you for Reporting ▽]

Tags: _____ 1640

Recipe Creation

Name: ⎯1610

Description: ⎯1620

Rule Matches | New Rule
☑ Rule 1
☐ Rule 2
☑ Rule 3
⎯1750

Category*
Non-Malicious ▽
Spam
Crimeware
Advanced Threats

Status*
Active ▽
Inactive
⎯1630

Actions:

○ No response will be sent

◉ Send a response to the reporter Create Response

Thank you for Reporting ▽

Tags: ⎯1640

FIG. 17

SUSPICIOUS MESSAGE REPORT PROCESSING AND THREAT RESPONSE

CROSS-REFERENCE TO RELATED APPLICATIONS

This application is a continuation of application Ser. No. 16/532,449, filed Aug. 5, 2019, now U.S. Pat. No. 11,146,575, which is a continuation of application Ser. No. 16/418,973, filed May 21, 2019, now U.S. Pat. No. 10,375,093, which is a continuation of Application No. 15/905,784, filed Feb. 26, 2018, now U.S. Pat. No. 10,298,602, which is a continuation-in-part of application Ser. No. 15/584,002, filed May 1, 2017, now U.S. Pat. No. 9,906,554, which is a continuation of application Ser. No. 14/986,515, filed Dec. 31, 2015, now U.S. Pat. No. 9,906,539, which claims the benefit of U.S. Provisional Application No. 62/145,778, filed Apr. 10, 2015, the entire contents of each of which are incorporated herein by reference.

FIELD OF THE INVENTION

The present invention relates to methods, network devices, and machine-readable media for an integrated environment for automated processing of reports of suspicious messages, and furthermore, to a network for distributing information about detected phishing attacks.

BACKGROUND OF THE INVENTION

In a phishing attack, an individual (e.g., a person, an employee of a company, a user of a computing device) receives a message, commonly in the form of an email or other electronic message or communication, directing the individual to perform an action, such as opening a message attachment or following (e.g., using a cursor controlled device or touch screen) an embedded link. If such message were from a trusted source (e.g., co-worker, bank, utility company or other well-known and trusted entity), such action might carry little risk. Nevertheless, in a phishing attack, such message is from an attacker (e.g., an individual using a computing device to perform a malicious act on another computer device user) disguised as a trusted source, and an unsuspecting individual, for example, opening an attachment to view a "friend's photograph" might in fact install spyware, a virus, and/or other malware (e.g., malicious computer software) on the user's computer. Similarly, an unsuspecting individual directed to a webpage made to look like an official banking webpage might be deceived into submitting a username, password, bank account number, etc. to an attacker.

Software as a Service (SaaS) solutions for sending simulated phishing messages are known, such as that described in U.S. Pat. No. 9,053,326. Such solutions for user training and education have been proven to reduce the susceptibility of users to phishing attacks. Some solutions provide the user with a user interface as a means for reporting suspected phishing attacks, such as that described in U.S. patent application Ser. No. 13/763,538. Provided with the means to report, due to the difficulty of discerning attacks from legitimate messages, users may report actual phishing attacks, as well as legitimate messages. False positive reports sent to network security personnel are distracting and time consuming to process and respond to.

Thus, what is needed is a system for allowing network security personnel to quickly discern malicious messages from a large volume of reported threats.

BRIEF DESCRIPTION OF THE DRAWINGS

FIG. 11 illustrates an example cluster summary.

FIG. 13 illustrates an example rule creation.

FIG. 14 illustrates an example rule creation from a reported message.

FIG. 15 illustrates an example console module text view.

FIG. 16 illustrates an example recipe creation.

FIG. 17 illustrates an example recipe creation from a reported message.

DETAILED DESCRIPTION

Figure 1:
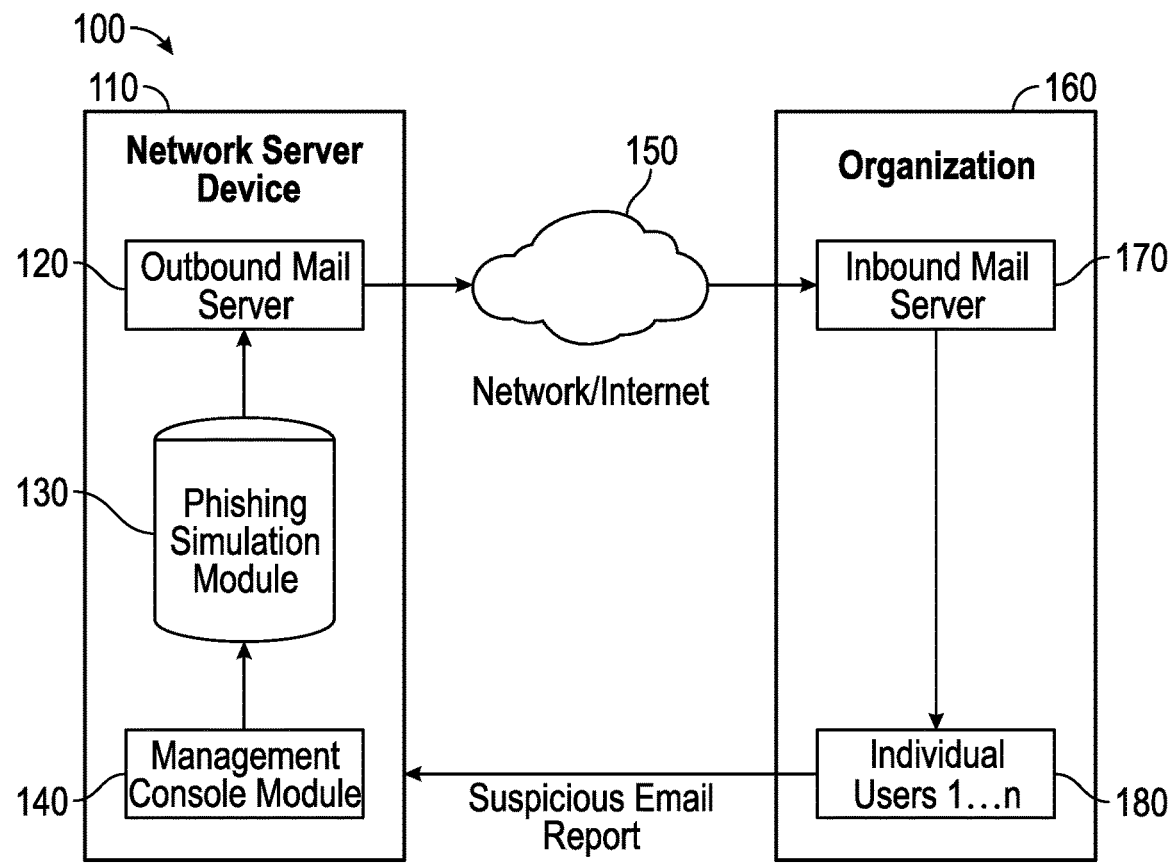
FIG. 1 illustrates an example system for simulated phishing message management according to one embodiment.

In the following description of embodiments, reference is made to the accompanying drawings which form a part hereof, and in which it is shown by way of illustration specific embodiments of claimed subject matter. It is to be understood that other embodiments may be used and changes or alterations, such as structural changes, may be made. All embodiments, changes or alterations are not departures from scope with respect to intended claimed subject matter. While the steps below may be presented in a certain order, in some cases the ordering may be changed so that certain inputs are provided at different times or in a different order without changing the function of the systems and methods described. The procedures described herein could also be executed in different orders. As a non-limiting example, the rules sharing procedure could be performed before or after sending simulated phishing messages.

Additionally, various computations that are described below, such as those within the user reputation modules, need not be performed in the order disclosed and other embodiments using alternative orderings of the computations could be readily implemented. In addition to being reordered, the computations could also be decomposed into sub-computations with the same results.

Overview of System Processes

The present invention addresses shortcomings of previous attempts to manage simulated phishing campaigns and counter phishing attacks. As used herein, simulated phishing attacks, as well as actual phishing attacks, may be embodied in the form of a message. As non-limiting examples, the message may be in the form of an electronic mail (email) message, a messaging service such as Short Message Service (SMS) or Multimedia Messaging Service (MMS), instant messaging, webpages, pop-up windows, blogs, Internet fora, social network applications, voice over internet protocol (VOIP) applications, video or voice messaging, or any other proprietary or open source means of electronically transferring content between computing devices.

As will be described in further detail below, the present invention provides a system and method for triaging reported malicious messages including a management console and a phishing simulation module. In general, the system enables security analysts to efficiently analyze and respond to phishing attacks, performs front-line analysis and response, and improves its analysis and response as users fine-tune it.

Users of the system are categorized into roles. The system may have any number of roles, each role having different limitations to perform functions of the system. In one embodiment, the system casts users into the roles of superusers (or system administrators), operators, and reporters. In this embodiment, superusers can perform any task in the system and perform administrative tasks. Operators are restricted from performing some of the functions of the system, such as administrative tasks. Reporters have the lowest level of access and will be discussed in further detail below.

Figure 2:
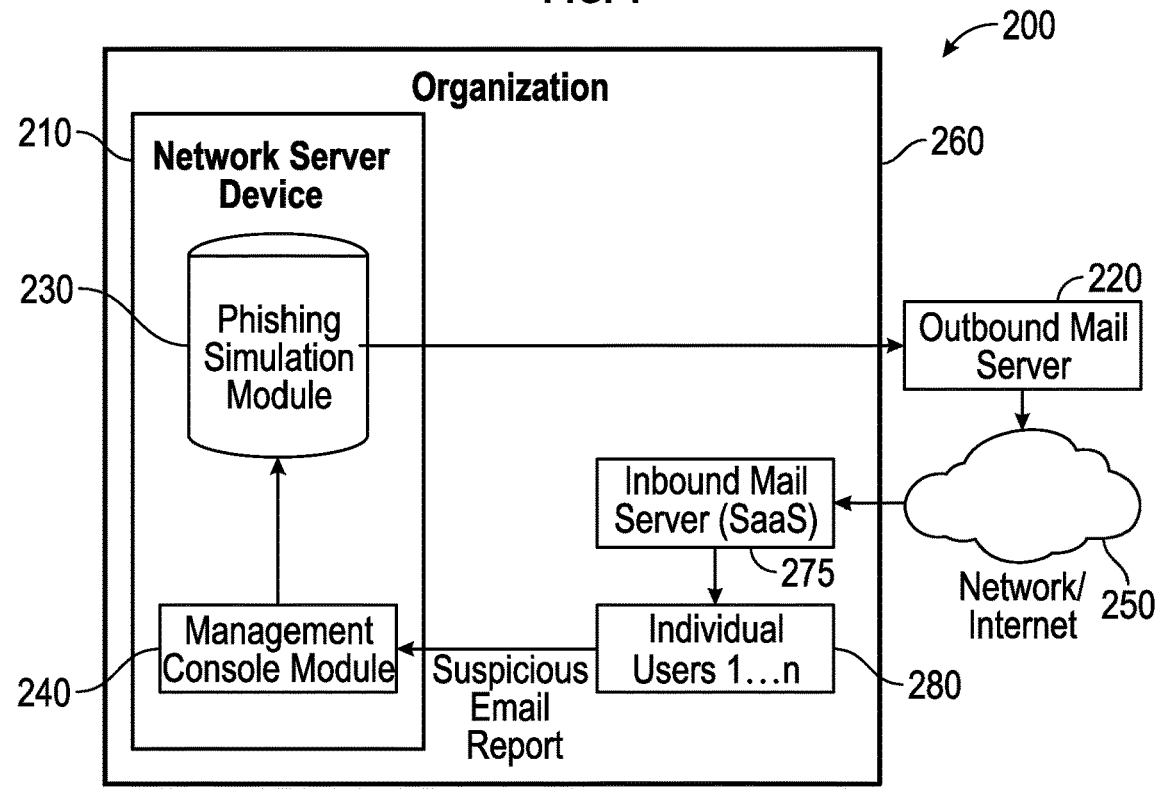
FIG. 2 illustrates another example system for simulated phishing message management according to another embodiment.
Figure 3:
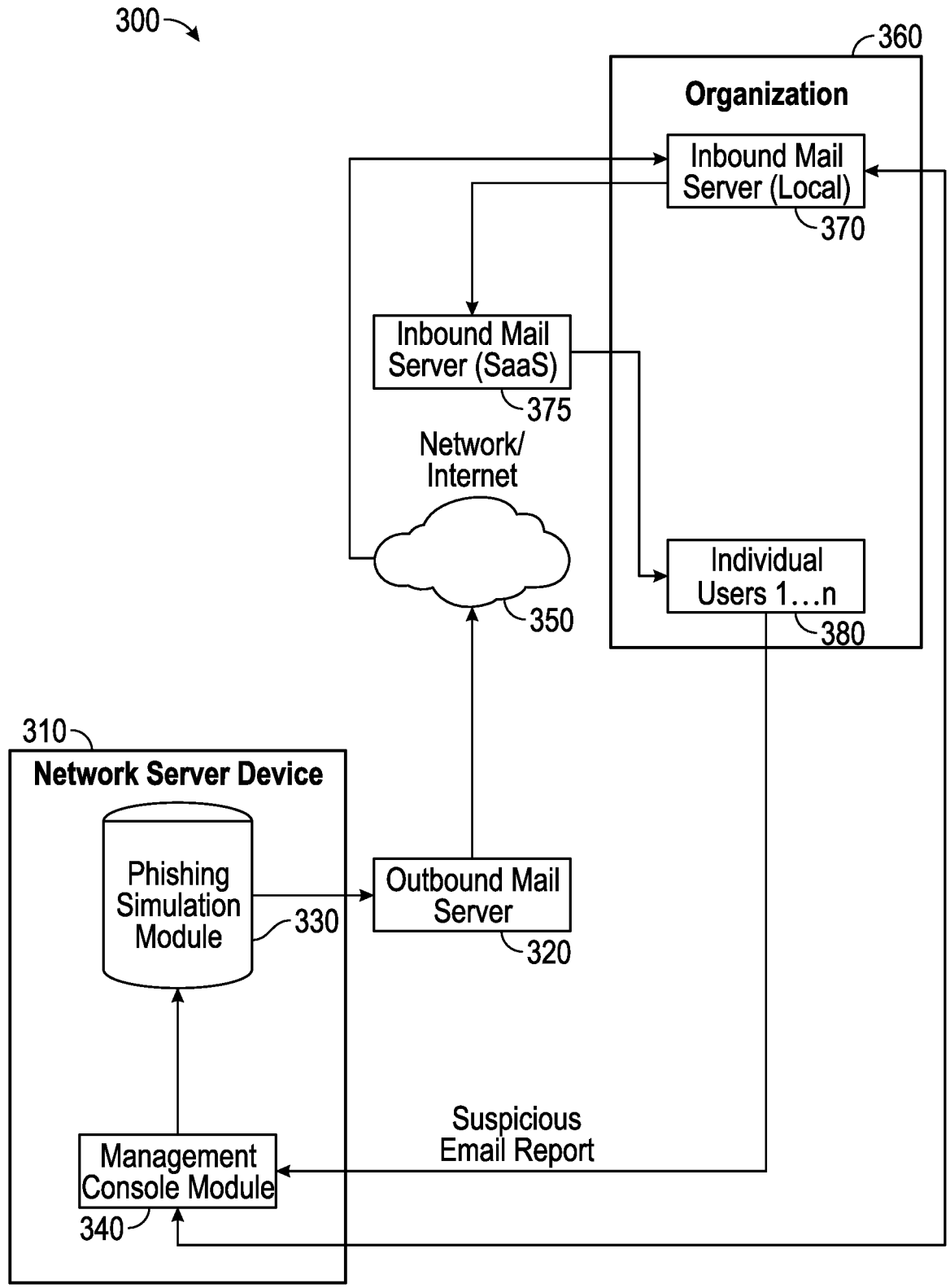
FIG. 3 illustrates another example system for simulated phishing message management according to another embodiment.

Example logical diagrams of such a system are shown in FIGS. 1-3, where like referenced numbers correspond to similar elements. Turning first to FIG. 1, a system 100 is illustrated as having a network server device 110 with access to an outbound mail server 120 that is in communication through a network 150 with an organization 160 such that messages can be sent from the network server device 110 to individual users 180 at the organization 160. In some embodiments, the organization 160 operates an inbound mail server 170 for receiving messages from external sources. The network server device 110 may also contain a phishing simulation module 130 for generating a simulated phishing campaign, as well as a management console module 140 to manage simulated phishing campaigns and incoming reported messages. Alternative configurations are illustrated in FIGS. 2 and 3. The inbound mail server 170 may be configured to provide messages directly to individual users 180, or may be configured to forward messages to a network message service 275, such as Gmail™ or Outlook™. The network message service 275 may allow access to the forwarded messages by any type of client device, such as handheld wireless or other type of mobile devices, such as those running Apple™ iOS™ or Android™ operating systems, as well as desktop systems. While certain components are illustrated as being a part of other components, such as the outbound mail server 120 being a part of the network server device 110 the various components described could be physically or logically located separately.

As illustrated in FIG. 2, the network server device 210 can be part of or contained within the organization 260. This allows for internal simulated phishing campaigns to be launched from a phishing simulation module 230. Alternatively, as shown in FIG. 3, the system can be external to the organization 360. In this and other embodiments, there can be a connection to an internal or external database containing information regarding confirmed malicious messages. This can be a connection to another organization with which information is shared, or a database to which a single or multiple organizations forward information and can receive information to develop recipes or determine if a reported message has already been identified as a malicious message. In any of the above examples, the network server device may generate a simulated phishing message in a phishing simulation module 330 to send to any number of individuals in the organization a simulated phishing attack message.

As non-limiting examples, the systems and methods described herein can be used to raise the acuity of the individual in identifying phishing attack messages and provide a means for identifying and reporting those messages so that remedial action can be taken with reduced time between arrival of the attack message and the remedial action. As described below, this can be accomplished in part by providing a console at which reports of suspicious messages can be efficiently reviewed. Each user reporting a phishing attack message may be given a reputation score. The reputation score may be adjusted based on correctly or incorrectly reporting a message as a phishing attack message. A correct report may be indicated when a user reports a message which was originally generated by the phishing simulation module in the system.

For messages that are not simulated phishing messages, the message or the source of the message can be assigned a credibility score similar to the reputation score of users of the system. Message content of similar messages, user reputation scores, and sender credibility scores may then be used to aid an administrator in triaging incoming reported messages.

Generation of a Simulated Phishing Message

Figure 4:
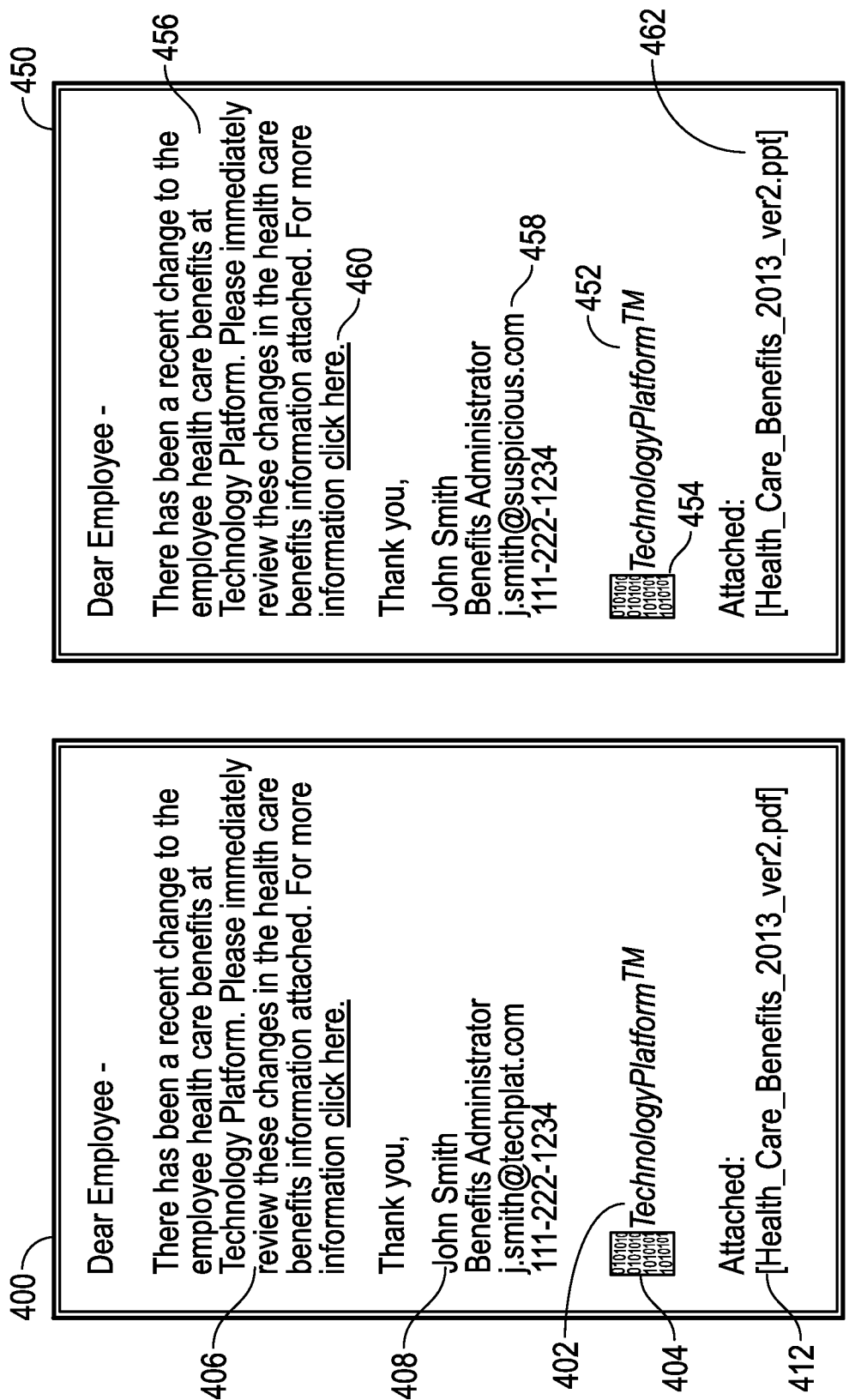
FIG. 4 illustrates an example trusted message and an example phishing attack message.

FIG. 4 depicts a comparison of a trusted message 400 and a phishing attack message 450 (whether simulated or real). Whereas the trusted message 400 contains actual information necessary to a recipient, e.g. an employee, the phishing attack message is disguised to look as if it were from a trusted source. The phishing attack message 450 may have similar logos 452, artwork 454, and text 456 as a trusted message 400 from an organization would (i.e logo 402, artwork 404, and text 406). A phishing attack message 450 may even appear to have a valid email address 458 associated with the organization, as in email 408 of the trusted message 400. The links 460 and attachments 462 in the phishing attack message 450, however, may contain malicious code or attempt to gain secure information, such as passwords, from the user. A simulated phishing attack message may be generated in a phishing simulation module. The phishing simulation module may provide a template message that can contain placeholders for, e.g., an employee name, a company name, a human resource representative, a human resource job title, a human resource email address, a human resource phone number, a company logo and a name of an attached file. FIG. 4 further depicts a simulated phishing attack constructed from the template message in the phishing simulation module. In the message depicted in FIG. 4, the recipient of the message is Employee who works at Technology Platform. The message is disguised to appear as if it were actually sent from John Smith, although it was, in fact, sent from a network server device conducting a simulated phishing attack. John Smith's job title, email address and phone number are included so that the message appears to be a legitimate email sent from Smith. The company logo 454 also helps to disguise the email as a legitimate email from Smith. The attachment name 462 is a fictitious name "Health Care Benefits 2013 ver2.ppt" made to resemble the name of an attachment 412 that the recipient (i.e., Employee) might expect to receive with such email.

The simulated attack message 450 may be personalized and/or targeted with individual-specific and company-specific information. The individual-specific information might include the recipient name, Employee, and the company-specific information might include the sender name, sender job title, sender email address, sender phone number, company name, and company logo. Company-specific information may be duplicated across different recipients. Company-specific information might also include a company address, company project names, company fonts, company font colors, company font size, etc.

The attachment name could be tailored to the recipient, a company, or could be a generic name. It would make sense to use a company-specific attachment name if, for example, a company uses a specific naming convention for file attachments.

The phishing simulation module may also store templates that may contain no placeholders. Templates without placeholders may be desirable so that every individual receives exactly the same phishing attack(s), permitting a uniform or standardized method of evaluating individuals. Templates without placeholders may be desirable in instances where the performance of an individual and/or an organization is compared with a benchmark.

Another technique to standardize simulated phishing attacks is to use a common attack vector across individuals, where an attack vector refers to the means of delivering one or more messages of a simulated phishing attack. Example attack vectors include email, text messages, and instant messaging.

The phishing simulation module may embed additional information into the simulated phishing attack message, so that the message may be identified as a simulated attack. For example, the simulated phishing message can have identifying characteristic data that indicates that the message is a simulated attack. As non-limiting examples, the identifying characteristic can be in the body of the message, associated with the message, or in metadata for the message, such as contained in a message header field. Header fields can be lines beginning with a field name, followed by a colon (":"), followed by a field body, and terminated by a carriage-return, line feed (CRLF). The identifying characteristic could be a sender identifier of the message, a recipient identifier of the message, a subject of the message, a time of transmission of the message, and a header of the message. The identifying characteristic can include one or more of a sender identifier of the message, a recipient identifier of the message, a subject of the message, a time of transmission of the message, and a header of the message.

Furthermore, the identifying characteristic may be encrypted and/or otherwise encoded, such that only the phishing simulation module is capable of generating a simulated phishing attack message that is recognized by a network server device.

An example identifying characteristic may be a header having encoded and encrypted data, which may be in the form of:

X-PhishMessageTracking: [Encoded (Encrypted data)]==

As in the above example, the header may have the data structure:

http://phishreporter.phishmessage.com/3918d3df-94ea-459f-af17-084474c0a801/email? expr=hh:mm:ss:UTC, where "3918d3df-94ea-459f-af17-084474c0a801" is an example identifier and a value associated with the variable name "expr" in a name-value pair (NVP) indicates an expiration time.

In some embodiments, the header may contain additional information, and have the data structure:

http://phishreporter.phishmessage.com/3918d3df-94ea-459f-af17-084474c0a801/email?c1=<integer>& c2=<integer>&v=<version>&b=<build>&t=<token>&s=<client code>&a=armor&expr=hh:mm:ss:UTC, where each NVP indicates a variable name and a variable value separated by an equal sign, additional NVPs separated by ampersands. Any or all of these example fields could be modified or removed and other fields could be added.

The header can include a unique or a substantially unique identifier generated by the system for tracking purposes. In some embodiments, the identifier can be an alphanumeric code. The header may also include, as part of identifier information or separately, an identification of the user for whom the simulated phishing message was generated. This may provide attribution back to the user who reported the suspicious message and support reputation management, as described in more detail below.

An example header may be encoded or encrypted, as described in further detail below, and appear as:

X-PhishMessageTracking: WwrKPZ5XSdJ+IZyIVO6+ NDk8Pnz8wBiGyJzYZmOATtsvyrdrDmVXhJIBw/ E7azGpmu1BFq4u5ItGQB7E4SgryqcZHc2UzP+ t2VcNmcHA3nnCveQRjIeLD35BxJDTN2+Lcwty1cXRs VKIv4eeAOFOLotiMbq6u85fyFntLIbO2rI79Ejxpg/ dJJJBJBJcXGKnacUvPsWu7lmIlkW73T6vcvJg2grPt+ 1HoPhOsitn82X8u/gW4617zoqD+WsOk/ BP1Pb3eJQFYMTWK2gjLvV7CSsoPX9kZ/ RxTjXRHKWm29BVwzTeY3Hx6/7XTJFdHrZaPcXMjq/ ROgFJPOtSm2zA+g==

Reporting of Suspicious Messages

The system can include a method for a user, having received any arbitrary message, to report the message as suspicious. A user who reports a message as suspicious is referred to as a "reporter." Some or all of the suspicious message that is reported and any header or other identifying information relating to the suspicious message, may be combined or taken separately, with or without other information, is referred to as a "report." As non-limiting examples, a message may be considered to be suspicious if some aspect of the message causes the recipient to suspect that it is being sent for a malicious purpose or from an unfamiliar source or contains other indicators that the message is not from who it represents itself to be from. Non-limiting examples of suspicious purposes can be to solicit access credentials or other types of personal or confidential information, or to induce the recipient to execute malicious software provided by the message. The system can be configured to allow reporting of messages generated according to the simulated phishing methods described above, or sent from another source.

When a message is received on a computing device of an individual, the user may report the message as a possible phishing attack. When reported, a network server device then receives a notification indicating that the one or more users has reported the message as a possible phishing attack. Such notification may be received via email (e.g., the suspicious email forwarded to a network administrator of network server device) or by an out-of-band means, using any protocol sufficient to transmit the notification. In one embodiment, a plug-in built into an email client (e.g., Microsoft™, Outlook™ IBM™ Lotus Notes™, etc.) or a web-based email client (Gmail™ from Google™, Yahoo!™ Mail™ from Yahoo!™) may provide users of the mail client with a toolbar and/or graphical user interface element that, when selected or activated, automatically reports an email as a suspicious message (and more specifically, as a possible phishing attack) to the network server device (or administrator thereof) or a network device other than the network server device (e.g., an email security analysis engine). Alternatively, the reporting function can be a standalone program or function that allows a user to report a message. This can allow for drag and drop of messages from the program in which the message was received for reporting. The program can also execute in the background and enable other functionality, such as right-click functionality to enable a report functionality.

Figures 5A, 5B:
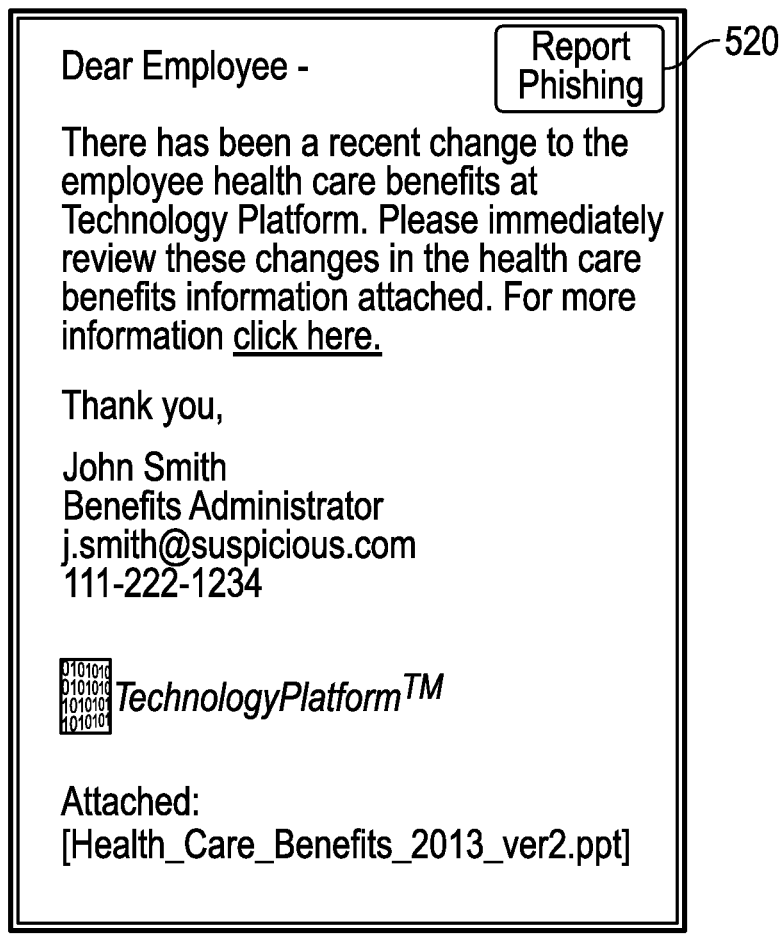
FIG. 5A illustrates a report button for reporting a phishing message from a message inbox view.
FIG. 5B illustrates another report button for reporting a phishing message on a message preview.

In any of the embodiments, a single graphical user interface action (e.g., one-click of a button, one-touch of a button) may be sufficient to trigger the notification to be sent to the network device. Examples of such a graphical reporting button are illustrated in FIGS. 5A and 5B. The graphical user interface can include a label to the effect of "Report Phishing" as a button 520, or may be presented as a contextual menu item 510. In some embodiments, a single click of a user-interface element may be sufficient to report a simulated phishing message generated by the system described herein. In such embodiments, identifying information relating to the reported message and/or the user who reported the message may be communicated to the network server device while the body of the message is not transmitted to the network server device. In further embodiments, when reporting a suspicious message not generated by the system, an additional confirmation dialog may be presented to the user before all of some the message is communicated to the network server device for further processing.

Additionally, the system can receive a suspicious message from a reporter in a variety of other ways. In one embodiment, the system is associated with a designated email address for receiving reports. A reporter may report a message as suspicious by sending the suspicious message directly to the system, attaching the suspicious message to an email that is sent the system, or forwarding the suspicious message to the system via the associated email address.

In the process of reporting, the reported message body and/or any associated headers or metadata may be included in its entirety, partially included, or omitted. The identifying characteristics of the suspicious message described above may be sent to the network device. The network server device may be notified that a message has been reported by one or more individuals as a possible phishing attack by means other than email, including a SMS message, a telephone call, an instant message (IM), etc.

In some embodiments, activating the report functionality causes the entire message to be forwarded from the client computing device to a pre-configured address at the network server or management console as an attachment. In other embodiments, less than all of the message is transmitted for processing, in some cases only header information and/or a subset of the message body or attachments. In some embodiments, the pre-configured address could be a distribution list. After being reported, the system at the client computing device can move the reported message to a "Deleted Items" or "Junk" folder, or apply a corresponding deleted or junk label, or take no action with respect to moving the message.

Alternatively, or in addition, the system may be configured to store messages in an electronic data store at the network server device or other location accessible to the management console module without forwarding through a general-purpose email server or using simple mail transfer protocol (SMTP).

Alternatively, or in addition, a message may be set to be inaccessible to the reporting individual upon it being reported (or otherwise quarantined) and remain in such status until there is a resolution to the status of the message. If the message is determined not to be a phishing message, it is returned to a normal accessible status. If it is determined to be a phishing message, then the message can be deleted or moved into "Junk" folder or such action be taken.

The system can determine whether or not the message being reported is a simulated phishing message generated by the system. Generally, the system breaks down the reported message into message components. As non-limiting examples, message components are a header, a body, attachments, and URLs contained in the message, or any combination thereof. The overall process uses these components to: 1) find a specified header key, 2) decode and/or decrypt the value for the header key, 3) if the decode and/or decrypt was successful, get a tracking URL encoded in the header, and 4) determine if the message is a known simulated phishing attack based on whether or not the decode and/or decrypt was successful. The determination of whether or not the message being reported is a simulated phishing message generated by the system can be performed at the client device where the message is received for access by a user, or at a remote device, such as the network server device, or at both devices. The steps of the determination may also be split between multiple devices, such as the client device and the remote device.

Figure 6:
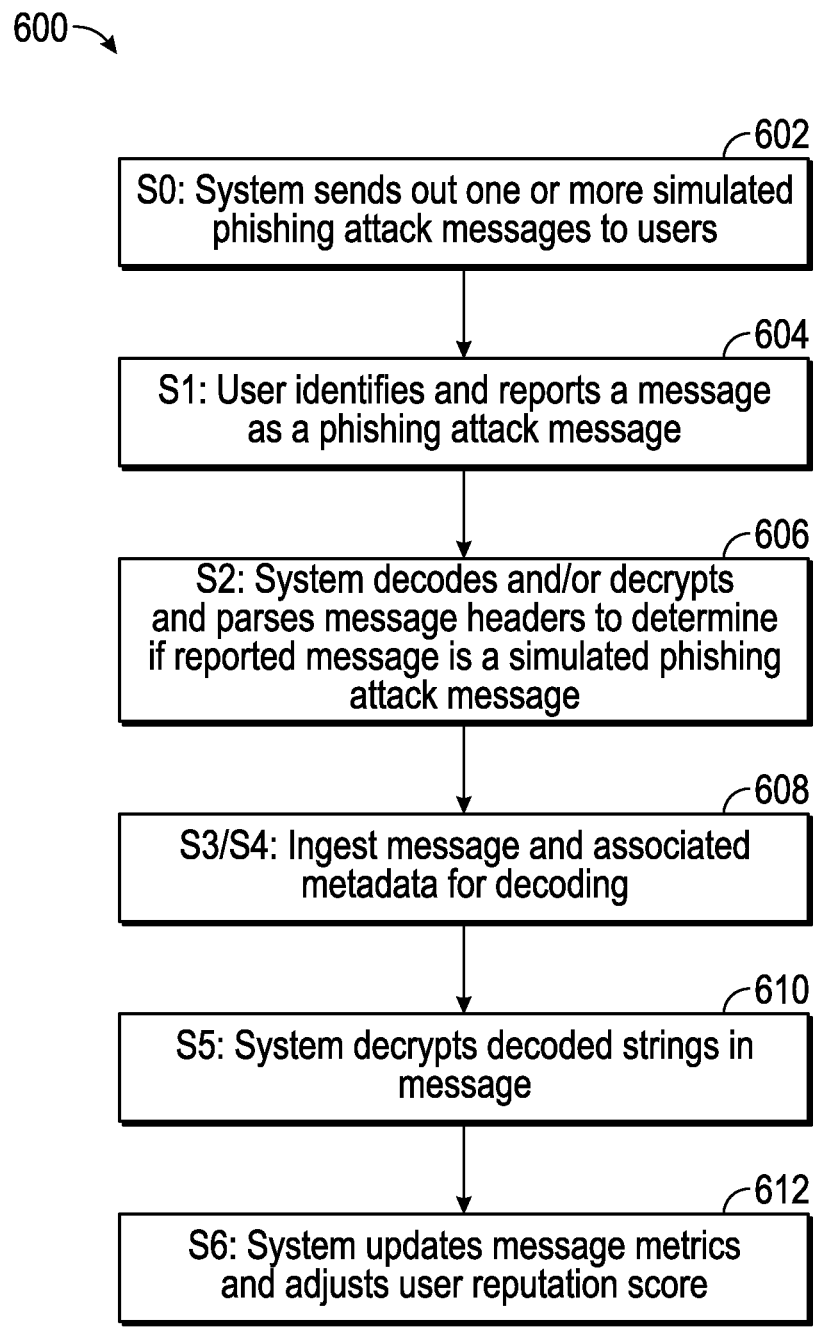
FIG. 6 illustrates an example system process for determining if a reported message was a simulated phishing attack and adjusting a reporter's reputation score accordingly.

An example process of simulating phishing messages and responding to suspicious messages, as described above, is illustrated in FIGS. 6 and 7. Turning first to FIG. 6, an example flow 600 for sending a simulated message is illustrated. In stage 602 (step S0), a phishing simulation module generates a message for a simulation/scenario. The message may be generated from a template, as well as contain an identifying characteristic, such as in a header. For example, the identifying characteristic may be X-PhishMessageTracking: header. The header may also be encrypted and/or encoded and may contain a tracking URL linking the message and the user to whom the message was sent to for a scenario. The message is then sent to a user. In stage 604 (step S1), the recipient of the message (e.g., the user) clicks on a reporter button. In stage 606 (step S2), code executing at the client device parses the message for the X-PhishMessageTracking header. In stage 608, if the header is found, the system ingests the encoded string associated with the header (step S3) and the string is decoded (step S4). In stage 610 (step S5), the system then attempts to decrypt the decoded string from stage 608. The header can be encrypted and/or decrypted using symmetric or asymmetric cryptographic techniques. If the header is encrypted using asymmetric cryptographic techniques, such as but not limited to Public Key Infrastructure (PKI), the header may be encrypted at the network server device using a public key and then decrypted at the client device using the corresponding private key. The system can be configured to generate multiple headers for multiple messages using the same public/private key pair or generate a unique public/private key pair corresponding to each message generated. In some cases, a single phishing campaign may be configured to use a single public/private key pair. The private keys may be distributed to the client devices either directly from the network server device or through an intermediary to which multiple client devices are communicating. Finally, in stage 612 (step S6), a user reputation score is updated using the tracking URL extracted from the simulated phishing attack message. For exemplary purposes, if the user correctly identifies the message as an attack message, the user's reputation score may be increased.

Figure 7:
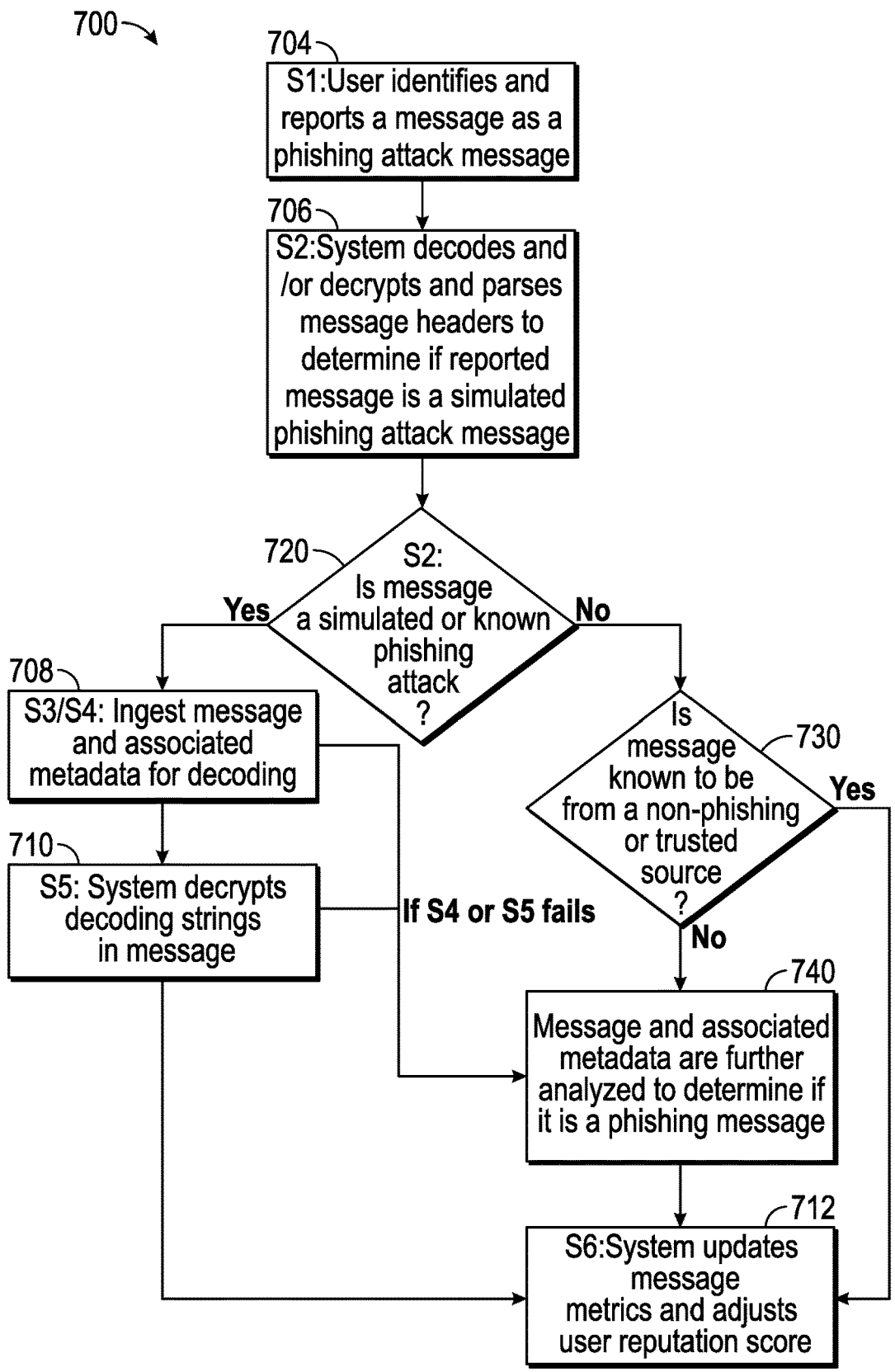
FIG. 7 illustrates an example system process for updating a reporter's reputation score where the reported message is not necessarily a simulated phishing attack.

As illustrated in flow 700 of FIG. 7, the system may also respond to messages other than simulated phishing attack messages. As in FIG. 6, the system may receive a message identified as a potential phishing attack in stage 704 (step S1) and proceed to stage 706 (step S2), where the message is decoded and/or decrypted. Unlike FIG. 6, after stage 706 (step S2), the flow 700 may proceed to stage 720, where the message is determined to be a simulated or known phishing attack. If the message is not a known phishing attack or simulated phishing attack message, the system treats the message as non-simulated suspicious message and processes accordingly by, e.g., forwarding it to a pre-configured address and proceeds to stage 730. Additionally, if the header data relating to an expiration time (expr=hh:mm:ss: UTC) has expired, then the message may also be treated as suspicious, continuing to stage 730. In those embodiments, as a non-limiting example, some of or all of the reported message may be forwarded to an address accessible in a mail server by any appropriate protocol, such as, but not limited to, Internet Message Access Protocol (IMAP), Post Office Protocol (POP), ActiveSync™, or Exchange™ The reported message address may be at an intermediate message store configured for collecting the reported messages. In stage 730, if the system determines that the message is not from a non-phishing or trusted source flow 700 proceeds to stage 740, otherwise flow 700 proceeds to stage 712. In a stage 740, the message and associated metadata are further analyzed to determine if the message is a phishing attack message.

Returning to the decision in stage 720, if, however, the message is a simulated or known phishing attack, flow 700 proceeds to stage 708, as in FIG. 6. As a redundant check, if the system is unable to determine metadata in stage 708 (step S4) or decode and/or decrypt the metadata in stage 710 (step S5), flow 700 also proceeds to stage 740. Otherwise, flow 700 proceeds to stage 712 (step S6), where the user reputation score is updated.

In some embodiments, code executing at the network server device can parse the header and make the determination as to whether or not the message being reported is a simulated phishing message generated by the system. In those embodiments, certain information may be first stripped from the message before forwarding for further analysis. In particular, identifying information such as the to: header field and domain name information may be removed.

As in FIG. 6, in stage 712 after decoding and decrypting, the system derives a tracking URL (step S6). The tracking URL could be in the form of "https://phishreporter.phishmessage.com/3918d3df-94ea-459f-af17-084474c0a801". Having successfully decoded and decrypted the string (the contents of which are a tracking URL in step S6), the system calls out to that URL to update metrics related to the simulated phishing message. As example metrics, tracking and identifying information from the string can be used to update a reputational score associated with the user reporting the message, as further described below.

Suspicious Message Received at Management Console Module

In some embodiments, the system may access the forwarded suspicious messages from an intermediate message store by any appropriate protocol, such as, but not limited to, Internet Message Access Protocol (IMAP), Post Office Protocol (POP), ActiveSync™, or Exchange™ and retrieve the messages from the reporter inbox. Using the method described above, it is previously determined whether the suspicious message is a system-generated simulated phishing message. If that check has not yet been performed, it can be performed at this time.

In one embodiment, reported messages are received at the network server. The reported messages are checked against rules stored in the system. The rules can be written for YARA or another tool that enables determining whether message or attachment data contains defined textual or binary patterns (e.g. regex parsing, etc). A module for managing the processing rules is described in more detail below. A set of designated rules may form the basis of a recipe, described in more detail below. If a recipe is triggered, the report is categorized. Categorizing a report can be an element of the analysis. When categorized, a report is considered processed. As a result of the parsing, information about the reported messages can be processed and presented in a console, or other administrative portal.

In one embodiment, the system places unprocessed messages into any number of folders for further analysis by a user. As a non-limiting example, the system separates unprocessed reports by presence or absence of URLs and attachments. If the uncategorized message has an attachment, URL, or both, the message is placed into an "Inbox" folder. Otherwise, the message is placed into a "Recon" folder. Differentiating these unprocessed reports is important since the critical points of focus between them differ. Analyzing reports in the recon folder focuses on identifying the true sender of the email and analyzing the content of the report. These unprocessed reports can be presented in additional views, as will be discussed in further detail below.

Console Module

The system can include a console module, which can also be referred to as a dashboard, portal, or by a similar label. The dashboard provides an easy-to-scan representation of the number of reports processed, the number of reports to be processed, the categories of reports being processed, what rules and recipes are being used most frequently, and how well reporters are identifying threats. The dashboard provides multiple views of the reports submitted and the threats the system has identified to enable a user to see trends, highlight risk areas, and prioritize work.

The console module can display various administrator controls and options, as further described herein, as well as a list of suspicious messages submitted by users using the methods described herein. The interface can organize and prioritize reported messages.

The interface can indicate, for reported messages, the reputational score of the reporting user. As described elsewhere herein, the console module can cluster messages according to common criteria or characteristics contained in a cluster module depicted in FIG. 9 and discussed in further detail below. Broadly, clustering is used to identify commonalities among multiple reports. As these commonalities are discovered, the system creates a cluster of reports. The system or users can process reports in a cluster as a single unit rather than having to process each report individually. Clustering significantly reduces the volume of individual reports that a user would otherwise have to process.

Figure 10:
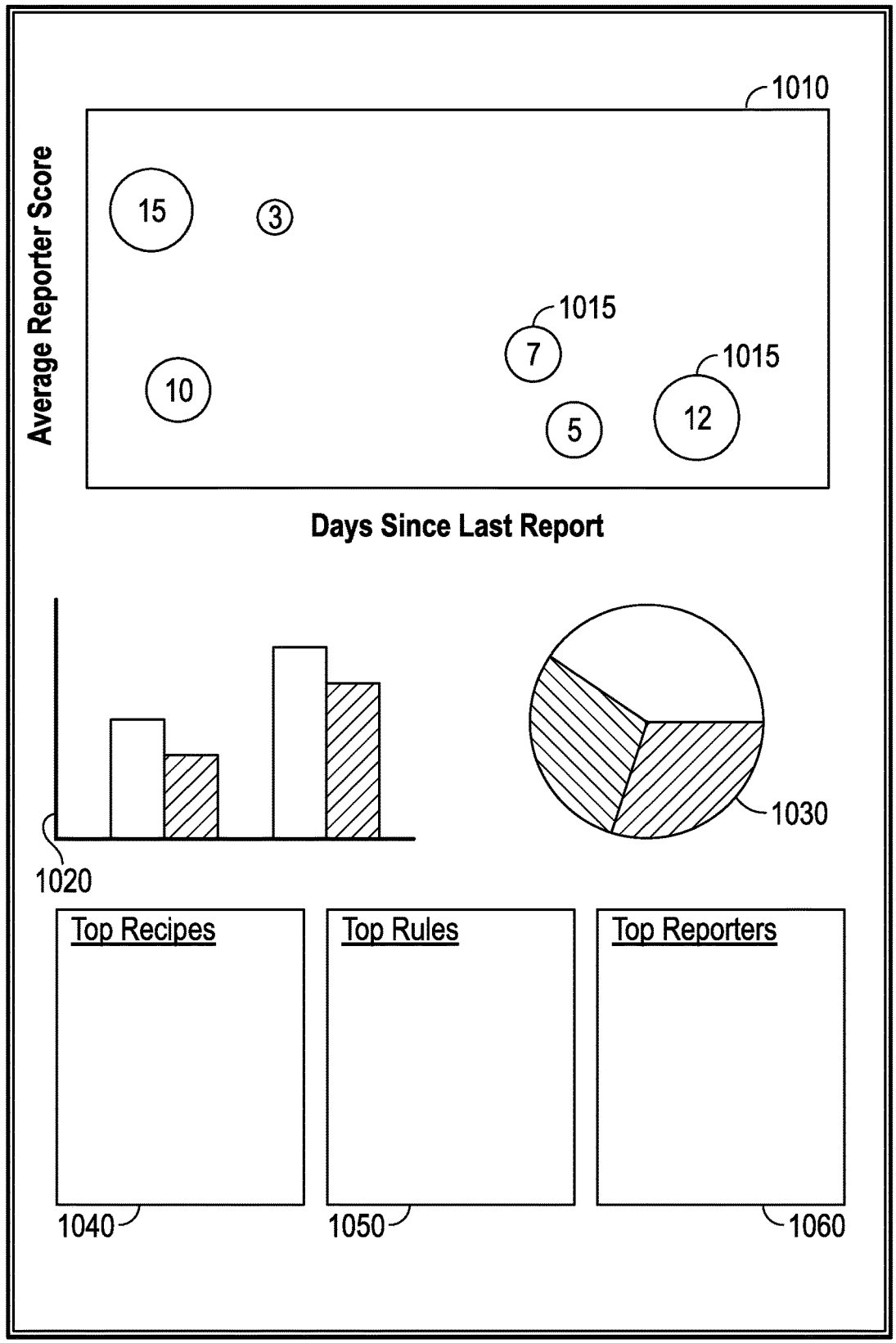
FIG. 10 illustrates an example console module dashboard view.

The console module provides invaluable resources to an analyst for acting on threats to an organization and is structured to allow the analyst to make quick and informed decisions based on information available to the system. An example of a console module (dashboard) is shown in FIG. 10. In FIG. 10, the dashboard 1000 may display a chart 1010 of all clusters 1015 from the cluster module. Each cluster 1015 may be plotted according to the days since the last report, as well as the average credibility score of all users in the cluster, though other graph dimensions are contemplated. The clusters 1015 displayed in the chart 1010 may be limited based on size and age, as defined by the user. For example, the chart 1010 may only display clusters 1015 that are larger than 1 report and that are active within the last month. Each cluster 1015 may also be presented as a shape having dimensions that correlate to additional cluster information. For example, each cluster 1015 may be a circle having a relative size based on the number of messages assigned to the cluster, and a color associated with a severity. In this respect, an analyst may quickly glean which clusters pose the biggest threat. For example, a larger cluster with a higher average credibility rating may take precedence over a smaller cluster with a lower average credibility rating. Each cluster 1015 may also be clickable, such that when clicked additional information about the messages assigned to the cluster is displayed in a cluster summary. Each cluster 1015 may also present additional information to the user upon hovering over the cluster 1015. This information may include the highest priority of any matched rule, the number of reports in the cluster, the average Reporter Reputation Score (averaged over all reporter scores in that cluster), whether the reports contain any URLs or attachments, reputation score, and age of the cluster.

The dashboard 1000 may also display additional information that an analyst may find necessary for quickly processing incoming email. For example, the dashboard 1000 may also display a bar graph 1020 depicting the number of manually and recipe matched rules over time, a pie chart 1030 depicting the relative categories of reported emails (e.g. non-malicious, spam, Crimeware, advanced threats, and uncategorized), as well as any number of lists, such as a list of the top recipes 1040 indicating the most frequently matched to reports, a list of the top rules 1050 indicating the rules the system has matched most frequently to reports, and a list of the top reporters 1060 which indicates the reporters who report the highest threats.

The top recipes 1040 section displays, and is sortable by, recipe name, category, and number of matched reports. Clicking on a recipe name will open that recipe in the recipe editor. The top rules 1050 displays, and is sortable by, rule name, priority, and number of reports matched. Hovering over a rule name will display the rule's priority, description and definition (e.g. a YARA definition). Clicking on the rule will open the rule in the Rule Editor. The top reporters 1060 section displays, and is sortable by, reporter name, reporter reputation, and number of emails reported. Clicking on a reporter's name will open up detailed information about the reporter.

The user may customize the bar graph 1020 to display results in a particular time, as well as to display only manual matched reports or only recipe matched reports. Hovering over a group in the bar graph 1020 displays the number of reports processed and the time when the reports were processed. The user can customize the pie chart 1030 by selecting which categories to include and providing a date range. Clicking on a segment representing a category within the pie chart 1030 will display a list of only those reports that are included in that category.

A user may customize the dashboard 1000 to display any combination of clusters 1010, bar graph 1020, pie chart 1030, top recipes 1040, top rules 1050, and top reporters 1060. Additionally, the user may customize the clusters 1010 by setting the age and the size of the cluster to display.

Uncategorized (unprocessed) reports may be displayed in either an administrator inbox or an administrator recon box. FIG. 15 illustrates an example administrator inbox 1500. While viewing the administrator inbox 1500 of the console module, the messages in this example are reported messages from the "Inbox" folder in a list format, illustrating credibility scores 1510 for the sources of the messages, rules matched 1520 by each reported message and the number and types of attachments 1530 for each message. Alternatively, the list view may display a column for each of Report Count (the number of reports in the cluster, which opens the cluster or report when clicked), From (the email address of the sender), Subject (the subject of the email, which opens the cluster or report when clicked), Last Received (the date and time the message was received), Last Reported (the most recent date and time the email was reported, which opens the cluster or report when clicked), Reporter Reputation (the reputation of the reporter who made the report, which opens the cluster or report when clicked), Match Priority (the priority of the highest-prioritized rule the report or cluster matched, which opens the cluster or report when clicked), Rule Matches (the rule names or numbers which match, where hovering over the rule shows the detail of the rule and clicking on the rule filters the administrator inbox 1500 on that rule name), Integration Results (the highest threat level of the report or cluster as assessed by a configuration integration, where hovering over displays the Threat Level, Source, and Item information and clicking an Item opens the detailed results for that item), Links (the number of IP addresses found in the report, where hovering over shows the details of the IP addresses and host names that point to them), and Attachments (the number of attachments in the report, where hovering over displays details of the attachments). The report, or message summary, which is opened upon clicking any of the above referenced columns is further illustrated in FIG. 12. The administrator inbox 1500 may be sorted, in either ascending or descending order, based on any number of the columns above.

The administrator inbox 1500 can be filtered by the email address of the sender (including a complete or partial email address), the subject of the email, rules matched (including complete or partial rule names, where a list of possible rule names are provided as the user types), and when the email was received (either by selecting from several date ranges or using a custom date range). In some embodiments, clicking on the name of a rule in the "Rule Matches" column adds that rule to the filter and sorting bar and filters the administrator inbox 1500 on that rule name.

Similar to the administrator inbox 1500, the system may provide a user with an administrator recon box that displays reported messages from the "Recon" folder in a list format. The list in the administrator recon box may display the following columns: To (the email address of the recipient of the report, which opens the cluster or report when clicked), From (the email address of the sender, which opens the cluster or report when clicked), Subject (the subject of the email, which opens the cluster or report when clicked), Received (the date and time the message was received, which opens the cluster or report when clicked), Reported (the date and time the email was reported), Reporter Reputation (the reputation of the reporter who made the report, which opens the cluster or report when clicked), Match Priority (the priority of the highest-prioritized rule the report or cluster matched, which opens the cluster or report when clicked), Rule Matches (the rule names or numbers which match, where hovering over the rule shows the detail of the rule and clicking on the rule filters the administrator inbox 1500 on that rule name) and Bundle (which downloads a bundle for the report when clicked). The administrator recon box may be sorted, in either ascending or descending order, based on any number of the columns above.

As with the administrator inbox 1500, the administrator recon box can be filtered by the email address of the sender (including a complete or partial email address), subject of the email, rules matched (including complete or partial rule names, where a list of possible rule names are provided as the user types), and when the email was received (either by selecting from several date ranges or using a custom date range). In some embodiments, clicking on the name of a rule in the "Rule Matches" column adds that rule to the filter and sorting bar and filters the administrator recon box on that rule name.

Downloading a bundle allows a user to download information about a report. The system allows a user to designate a filename for the bundle. Optionally, the user may provide a password to secure the file. Prior to downloading the bundle, the user may designate which components of the report should be included. Such components include, but are not limited to, raw email, headers, html body, plain body, URL, and attachments to be part of the bundle.

Returning to FIG. 10, upon clicking on any of the clusters 1015, the user is displayed a cluster summary. An example cluster summary 1100 is depicted in FIG. 11. The cluster summary 1100 may display a list of all messages assigned to the cluster. Each message may display a "to" address 1110, a "from" address 1112, a reporter score 1114, rule matches 1115 (where hovering over a rule displays details about the rule), as well as any other data associated with the message such as a subject, a received time, a reported time, and a severity level. The cluster summary 1100 may also have a preview panel 1150 to preview an individual message from the list of messages. The preview panel 1150 may contain options to display message headers 1120, a text-only view 1121, as well as a URL option 1124 to display all URLs contained in the selected message. Clicking on any message in the list may cause the console module to display message summary information about the message that was clicked in the preview panel 1150, or open a new message summary. As detailed below, the cluster summary 1100 may also have a button 1130 or link to create a rule directly from the cluster. As an alternative to a cluster summary 1100, the system may display a continuously scrollable list of all reports in the cluster.

Figure 12:
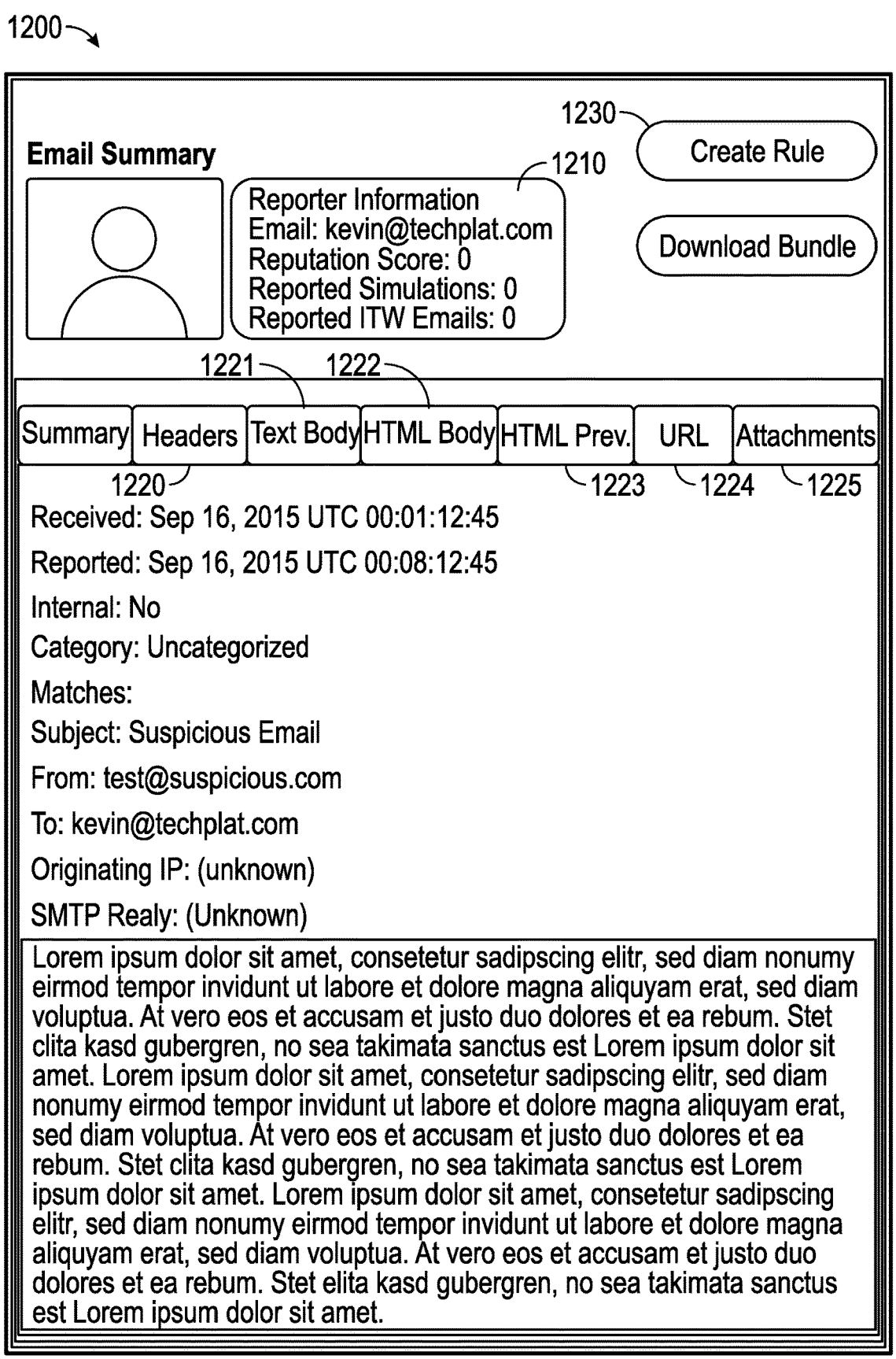
FIG. 12 illustrates an example reported message summary.

An example message summary 1200 is illustrated in FIG. 12. The message summary 1200 may indicate reporter information 1210, such as reporter email address, reputation score, when the message was received, when the message was reported, any rules which match the report, key fields from the header, reported simulations and reported ITW emails. In some embodiments, the message contents of a reported message are displayed to the administrator in an Attachment Viewer as a graphic without active links or text, such as a JPG image of the message to the administrator. The Attachment Viewer will be described in more detail below. Additionally, the console module may include options to display the message as a text-only format 1221, display the HTML, code 1222, an HTML, preview 1223, or the headers 1220 or other portions or formats for safe viewing and analysis of the message. Alternatively, the message components can be viewed individually. All URLs contained in the message may be displayed in a link option 1224. Images, and files contained within the message or as attachments may be extracted for separate viewing or analysis in an attachment option 1225. Certain options may be limited to specific personnel having credentials and requiring a password to access these options or to set a password for later opening of the files. The term administrator is used herein to indicate any individual with the role of monitoring and/or controlling the system, or computer instructions configured to perform the same tasks. The message summary 1200, may also provide a button to the user to submit any artifacts (e.g. URLs and attachments) contained in the message to third party integrations for further testing, as will be discussed below. Additionally, the user may set or change the report category within the message summary 1200.

The link option 1224 provides additional functionality to the user. For each URL displayed in the link option 1224, the user can view URLs under a domain, view results returned from a third party integration, manually submit a URL to a configured third party integration for further analysis, check the URL against an external Web site to find publically reported information about the URL, copy a safe version of the URL to the clipboard, copy the original URL to the clipboard, and export URLs. If a user chooses to export URLs, the system generates a file (e.g. a comma-separated value file) of all URLs for download. The user may select for all the URLs contained in the file to be defanged (i.e. removed of all threat components) or not.

Under the attachment option 1225, attachments can be further analyzed. Here, the system allows a user to view child files of an extracted compressed file, view results returned from a third party integration, manually submit an attachment to a configured third party integration for further analysis, check the attachment against an external Web site to find publically reported information about the attachment, copy a hash of an attachment to the clipboard, or download the attachment. If any of the attachments to the report are compressed files (e.g. a zip file), the system may attempt to safely decompress the contents and list the contents as individual attachments to the report. In some configurations, conditions can be applied as to how the system handles the extraction. As non-limiting examples, the system will not extract any child file larger than 100 MB, the system will stop extracting child files if the total of the extracted files exceeds 200 MB, and the system will employ a timeout on extraction, which if exceeded will not extract the child files from the compressed file. Once extracted, the system can run rules on all extracted files and send the contents to any third party integration. If a user chooses to download attachments, the user may specify a file name and optionally provide a password. The system will then create compressed file of all attachments of a report and make that file available to the user for download.

In one embodiment, the system displays any attachments to the user in an Attachment Viewer. The Attachment Viewer allows a user to determine the contents of the attachment, without the risk of opening the attachment. Rendering the content of attachments as images enables the operator to analyze the risk factors of a file without triggering any active content. The Attachment Viewer may be incorporated into the message summary under the attachment option, such as attachment option 1225 of FIG. 12. The system, through the Attachment Viewer, disallows any executables, scripts, or macros from running. If the attachment is of an otherwise valid file type, the system will render an image for each page of the attachment to be displayed to the user. Each element of a file may be rendered as an image. For example, each frame of an animated "gif" file may be presented individually. According to some embodiments, files may ordered. As a non-limiting example, files are ordered by whether they are malicious, suspicious, documents, text based, images, and uncategorized. The Attachment Viewer may render file types differently, based on the composition of the file. In one embodiment, if macros are present in a document, the Attachment Viewer will blur the image generated from the file. If a file contains XML portions, the system may also render those portions as an image for user inspection. Additionally, the Attachment Viewer may be configured to only preview a certain number of pages from each attachment.

Both the cluster summary and the message summary may also have a rule creation button (button 1130 and button 1230). The rule creation button 1130 and/or button 1230 allow for the administrator to create a rule from the reported message, as will be discussed in detail below. The cluster summary and the message summary may also have a recipe creation button to create a recipe from the corresponding cluster or message, as will be discussed in further detail below.

Rules Module

The network server can include a rules module for the creation, modification, and application of rules to the messages reported. The rules applied to the messages can identify textual or binary patterns in message data, such as the body, headers, or attachments of a message using wildcards, case-insensitive strings, regular expressions, special operators, or other operations. In some embodiments, as a non-limiting example, the rules can be YARA rules. The rules can be used to detect malicious messages based on local threat information. In an example process flow, a message is received at the network server and is processed by the rules.

The system rules module can be configured to process the messages received at the network server that have been identified as suspicious by a user. For the received messages, the system can process the messages with a pattern matching tool, according to pattern matching rules provided to the system. As a non-limiting example, YARA can be used as the pattern matching tool.

By default, messages that are reported and not cleared by initial rules processing can be considered to be suspicious. Further processing can be used to determine whether the message is malicious. Rules can be used to determine whether a reported message is suspicious or malicious. As non-limiting examples, maliciousness may be determined based on any URLs in the message, the content of the site at the URL, or an attachment to the message.

The rules processing described above can be used to categorize messages. Based on the results of the rules processing, in some embodiments through the interdiction module, described herein, further actions can be taken. The further actions can be any arbitrary action. As non-limiting examples, based on a rule match, a message can be assigned a threat level. The threat level can be based on the severity or priority of the matching rule. The threat level can be used in further processing, or as a basis for further processing, such as sending an alert notification, sending the message to an integrated system for further analysis, or for triggering execution of an action in the recipes module described herein.

Any rule can be associated with a severity, priority, or similar tag. The tag can be used to color code or group messages or in clustering, as described in more detail herein. In some embodiments, the system can be provided with default YARA rules. The rules can also be provided by a feed from an external source or otherwise imported.

FIG. 13 depicts an interface 1300 for creating new rules. Parameters for rules can include some or all of: a name 1310, a description, a severity value 1320, a priority value, rule content 1330 (e.g., YARA rule), a scope, and a status (active/inactive). For exemplary purposes, the priority value may be any number from "1" to "5", where the higher the number the higher priority. Further, a "1" may identify an internal email that is a non-threat. New rules are created as inactive by default. Any inactive rule will not be run on any incoming reported message or cluster. A user must change the status of the rule to active to enable the rule to run on reports. The administrator may change the scope by setting the rule to be matched against the message or against the attachment 1340. Rules may also reference other rules, but must have the same scope (i.e. all must either match against the message or the attachment).

A drag and drop rules editor interface can be provided so that parameters from a reported message can be selected and incorporated into a rule. The rule content 1330 can be inserted by a string editor, allowing a user to input a string as rule content 1330. The string input is one of text, a hexadecimal string, or a regular expression (regex). The system may then create rules, such as YARA rules, based on the user inputted strings. As a user inputs additional rule content 1330, the system will continuously attempt to match the rule against any currently open reports. If the rule module is accessed from a cluster, the rule module will attempt to match the newly created rule against all reports in the cluster and provide a visual indicator to the user as the rule content is input (e.g. through color coding upon a match).

Additionally, the rule content 1330 may be input by one of two YARA editors, a basic YARA editor or an advanced YARA editor. The basic editor works with the string editor to create YARA compliant strings and set one or more YARA conditions to create a YARA rule. Strings may be associated with a variable name, as well as flag information. The flag may be used to indicate additional information about the strings. Such information includes, but is not limited to, if the string is an ASCII string, if the string is a full word, if the string can be any case (i.e. lower case or upper case), and if each character in the string is represented by two bytes. The basic YARA editor also allows the user to test the YARA rule against a report. If the rule is created from a cluster, the test will also show all of the reports in the cluster which match the rule. The advanced YARA editor allows a user to directly write YARA strings and conditions, as well as paste them from other sources, to create YARA rules.

Turning to FIG. 14, if a rule is created from a reported message (e.g. the reported message in the message summary depicted in FIG. 12), the rule content 1430 may be prepopulated with meta-information from the reported message. When creating a rule from a report, the system identifies summary information from the header of the email, attachments to the email, and URLs in the email to be used in the created rule. If a rule is created from a report, the rule module may also display all of the tabs depicted in the message summary 1200 to allow a user to easily copy and paste strings from one source of information (e.g. header information) into the string editor. As an example, the rule content 1430 may include the sender email address and subject as strings to be used as a match condition. Rule content 1430 that is generated by a user in a rule created from a report will be validated as the user types. Validation ensures that the additional rule content 1430 that is input by a user continuously matches the reported message (i.e. by running the rule against the reported message to ensure that the rule continuously matches the reported message).

As discussed in more detail below, messages can also be presented in clusters. An interface can be provided by which rules can be created from clusters of reported messages. Similar to creation of a rule from a reported message, a rule created from a cluster may have rule content that is common to all messages assigned to the cluster.

Some rules created may be content-specific, such as rules that match addressee names or domain names. In some embodiments, those rules can be stripped of personal identifiers and/or rendered anonymous before sharing, as described in more detail herein.

The rules module can also develop rules based upon reported files and extracted information from the reported messages. This feature can work in combination with the interdiction module. As a message meets specific reporting thresholds, the rules module can be automatically implemented or an administrator can implement the rules upon review. This can include extraction of header information, content information or any other information that the management console module is capable of extracting. The extraction can be automatic upon meeting a specific threshold, such as number of people reporting the same message or reporting user reputation score above a threshold. The system can then aggregate the similar characteristics or pattern matching to develop rules. These can include if specific headers are identified, attachments, links, message content or any other element that malware and virus scanning programs detect.

In embodiments that use an interdiction module, upon a rule being developed, the interdiction module can execute a quarantine of messages or the recipes module can execute actions with regard to any current or future messages that trigger this rule.

All rules may be accessed and displayed via a "rules library." The rules library displays all the rules as a list, including information regarding the rule name, priority, and creation date. The rules may be searched based on the rule name (whether partial or complete), any tags associated with the rule (whether partial or complete), whether the rule is assigned to a recipe or not, and whether the rule is active or not. Clicking on a rule in the rule library opens a filtered view of the administrator inbox 1500, or administrator recon box, that only shows reports and clusters that match the rule that was clicked on.

As users create rules within the system, the rules may be shared with users of other systems. Rules shared with other systems are "community rules." Community rules may be imported to or exported from one instance of the system to any other instance system, based on the desire of the user. In one embodiment, sharing of rules between instances of the system is facilitated by a community exchange. Additionally, it may be desirable to have an intermediary, such as an analyst skilled in phishing threats, to validate any shared rule on the exchange. If the analyst finds that the shared rule is not valid, the analyst may remove that rule from the community exchange. A user of the system may list a rule on the community exchange by designating the rule as "shared" in the rule module (e.g. by flagging the rule as shared). In some embodiments, when a rule created by a user is listed on the community exchange, the user who created the rule is identified and listed by a nickname created by the user. Users who share their nickname will build a reputation in the community. In other embodiments, the user who shares a rule with the community remains anonymous. Once imported, the system may prepend a string to the community rule, such as "CX_", to identify the rule as a community rule. In some embodiments, the system may not allow a user to modify the community rule after they are imported, whereas other embodiments may allow a user to modify some or all of the community rules.

Additionally, the system may import non-local rules. As a non-limiting example, analysts create and validate non-local rules (e.g. YARA rules) to identify new threats as they emerge and as old threats are updated. These non-local rules are automatically imported to the system as they become available over a network service. In some embodiments, the system may not allow a user to modify the non-local rule after they are imported, whereas other embodiments may allow a user to modify some or all of the non-local rules. Additionally, the system may disable sharing a non-local rule, or a rule cloned from a non-local rule, with the community exchange. Once imported, the system may prepend a string to the non-local rule, such as "PM_" to identify the rule as a non-local rule.

In addition to rules imported from other network services (i.e. community rules and non-local rules), rules may also be imported from a file. Rules can be created from other rules by cloning. Cloning a rule simply copies all elements of the rule. Rules may also be edited or deleted at any time via the rules module.

Recipes Module

A recipe is a set of one or more automated or executable actions or instructions that can be performed by the system in response to receipt of a report of a suspicious message. The system can include an interface for creating recipes 1600, such as illustrated in FIG. 16. A recipe can be associated with a name 1610, a description 1620, a status (active/inactive) 1630, keyword tag(s) 1640, etc. and be configured to perform actions including, but not limited to, any or all of categorizing a reported message, sending preconfigured response to the reporting user, sending a notification to others of the reported message. As with rules, a recipe which has a status of "inactive" will not execute any actions or instructions. The system can also allow for the specification of arbitrary executable instructions to be performed as a part of the recipe. A recipe can be associated with one or more rules 1650, such as the rules described herein, and can be configured to cause execution of the specified instructions and/or activities upon the satisfaction of a rule. When a recipe is created from a cluster, the system will automatically associate all the rules common to the cluster with the recipe. A user may also define a category associated with the recipe. In one embodiment, the system provides the predefined categories: Phishing Simulation (i.e. the report contains email sent by the system during a simulated phishing campaign), Non-Malicious (i.e. the report contains safe, solicited email; internal email; or misreported email), Spam (i.e. the report contains unsolicited emails), Crimeware (i.e. the report contains malicious, mass-targeted malware), and Advanced Threats (i.e. the report contains malicious messages specifically targeted toward the user's organization or vertical). The user may also provide additional categories. As a reported message is received, the message can be processed by the rules stored in the system, including any community and non-local rules. If the reported message satisfies all or a certain minimum of the rules associated with a recipe, that recipe will be performed on the reported message. Any of the recipe actions described herein can be performed on an individual reported message or a cluster of reported messages, as described elsewhere herein.

To save a recipe, a recipe must be associated with a unique name. If a recipe is based on a non-local or community rule that is later updated or removed, the system may set the status of the recipe to inactive.

Users can have associated reputations, also referred to interchangeably as a reporter reputation, reporter reputation score, a reporter accuracy score, or reporter quality score. According to a recipe, the system can adjust the reporter reputation score points based on reporting activity by the user. An initial score can be assigned to users. The initial score can be based upon the background knowledge, education and experience of the user, such that a user with extensive experience in information security can have a much higher scored assigned initially than someone with less experience or education or training. An initial score can be zero, positive or negative or any other value used to rank user reporter reputation score. An initial score can be assigned to a user at a later time. For example, an initial score may not be assigned to a user until the user has conducted training for identifying malicious messages, or has been determined to have reported or been exposed to at least a certain number of messages at which time a score is assigned. After an initial score is assigned, a user may have the score increased for correctly reporting malicious messages, and have the score decreased for reporting legitimate messages as suspicious. Example scores may be advanced persistent threat (APT)=75 points; crimeware=10; non-malicious=−5; spam=−1; simulated phishing messages=+5 points. While each of several predefined categories may have a certain score associated with them, the Recipe Module allows the user to override the default score. In one embodiment, if a user specifies a reporter score, the specified score will override the category default score.

Different users can have their scores adjusted differently, such as having multipliers for their knowledge level such as a basic user who reports a non-malicious message has the reputation score reduced by 5, while a system administrator or technical expert could lose a multiple of that. The system can also be configured to reduce the reputation score of a user who fails to report a suspicious message that user is known to have received, or received and opened, after a specific period of time has elapsed. Points can be reduced based on failing to report either a simulated phishing message generated as described herein or an actual malicious message. Points can also be reduced for reporting a legitimate message as well. Alternatively, if a user falls victim to a phishing attack or malicious message and reports it after the fact, this can have a different point value than reporting the message prior to falling victim. The user who fell victim to the message can also have their reporter reputation score adjusted differently even though they reported it because they fell victim.

A recipe or rule can be configured to auto-reply to a user with a response after receiving a report from that user. The auto-reply can be to indicate that the reported message is not, in fact, suspicious. As a non-limiting example, if the message was an Advanced Threat, the auto-reply can congratulate the reporter for recognizing an Advanced Threat. Alternatively, the changes in scores can be different for different users. This can be based upon one or more factors such as the complexity of the malicious message, the experience, education or training of a user or their position or title. Additionally, the recipe can be configured to send various notifications to other teams, as will be discussed in further detail below.

If multiple users report copies of a message, or messages with the same identifying characteristics, this can result in a modifier of the normal score to the message. For example, instead of using the average score reputational score of the reporting users, there can be a modifier that increases the score if a certain number or percentage of users reports the message. This modifier can be changed the more users report or the more users with high reporter reputation scores report a message. This can be tied into the clustering of messages as well to allow increasing, or reduction of, the message score based upon how the message is clustered.

As a non-limiting example, a recipe could be used to resolve reports of suspicious messages and thereby prevent the report from appearing in the console inbox. For example, a rule may be created to match a legitimate message sent by the human resources department of an organization. A recipe can also be created that processes reports satisfying the rule by automatically responding to the user, indicating that the message is legitimate, and removing the message from display in the management console. As illustrated in FIG. 17, a recipe 1700 may also be created directly from a cluster summary (as in FIG. 11). A recipe 1700 created from a cluster summary may import criteria from the cluster (e.g. matched rules of the cluster) as a basis for the recipe execution. For example, recipe 1700 includes all rules 1750 corresponding to the cluster summary from which the recipe was created. As recipes are updated, the interdiction module can automatically be run to remove or block specific messages that match a recipe that is developed.

The system provides a testing mechanism for the recipe within the recipe editor to ensure that the recipe is executed correctly against a defined threat. A user may choose to activate or deactivate a recipe at any time.

All created recipes may be viewed in a "Recipes Tab". The Recipes Tab lists all recipes by recipe name, category, description, tags, and status. Recipes may be searched via the Recipes Tab by the name of the recipe (whether partial or complete), the category, any tags of the recipe (whether partial or complete), and whether the recipe is active or not. Recipes may be created, edited, deleted, or modified at any time.

Response Manager

The system can include a response manager. The response manager can include an interface for composing responses to users who have submitted reports of suspicious messages. When the system matches a report to a recipe that is associated with a response, the system will generate an email from the response and send the email to the person who submitted the report that matched the recipe.

Using the response manager, various pre-composed responsive messages can be stored and later selected for sending to users. The response manager can also incorporate information relating to the reported message, such as but not limited to subject, reported time, and/or received time. This information may be provided to the user to incorporate into the response as variables. As a non-limiting example, the Response Manager may provide the variables "[REPORT_DATE]" and "[SUBJECT]" to refer to the date the report was created and the subject of the suspicious message, respectively. The response manager can be implemented as a template with placeholders for these types of information, or others. The response to the user can include a report of the user's reputation or other metric indicating the past performance of a user in reporting suspicious messages.

Responses can be electronic messages, such as emails. Responses can be automatically sent to users who report messages. The response can depend on any one or more of the reputation score of the user, title of the user, content of the message reported or recipes matched. Responses can be triggered by actions of other modules, such as the interdiction module, actions taken within the management console, or creation of recipes.

If the system matches the suspicious message to multiple rules and multiple recipes, the system may only send the response with the highest priority. If the system matches multiple recipes of the same priority, the system will only send a response that is the most newly created of that priority level.

To save a response, the user designates a unique name and may optionally provide a description for the response. The user then specifies a subject and a body of the response. The Response Manager also allows the user to select if the response should include the original report as an attachment. Selecting this option will attach the original message in the response. The user then selects any recipes to be associated with the response. Additionally, the user may optionally provide carbon copy "CC" or blind carbon copy "BCC" email addresses which will also receive a copy of the response when sent. Responses may be previewed, cloned, edited, and deleted. The system also provides a mechanism to send a test of the response.

When reviewing a response in the Response Manager, the system provides a mechanism for the user to view and export the history of the response. Specifically, the system may retain information about every response email which was sent to a reporter. The sent email responses may be viewed in a list, or tabular, view with columns indicating a "To" address, the timestamp for when the response was sent, the subject, and the recipe which was triggered to send the response. The sent responses can be sorted by any column. Exporting the history includes the system producing a file of the response history (such as a CSV file) and providing the file to the user for download.

The response may also be in the form of a template to provide a notification to other groups, teams, or individuals. Notifications can be created and managed using a Notification Manager (similar to the Response Manager). In one embodiment, the system completes certain portions of the template before sending the notification. For example, a user may create a response template such that when a cluster is categorized, domain information common to the cluster is substituted into the response template and sent to inform a network team to block that domain.

Message Interdiction Module

Figure 8:
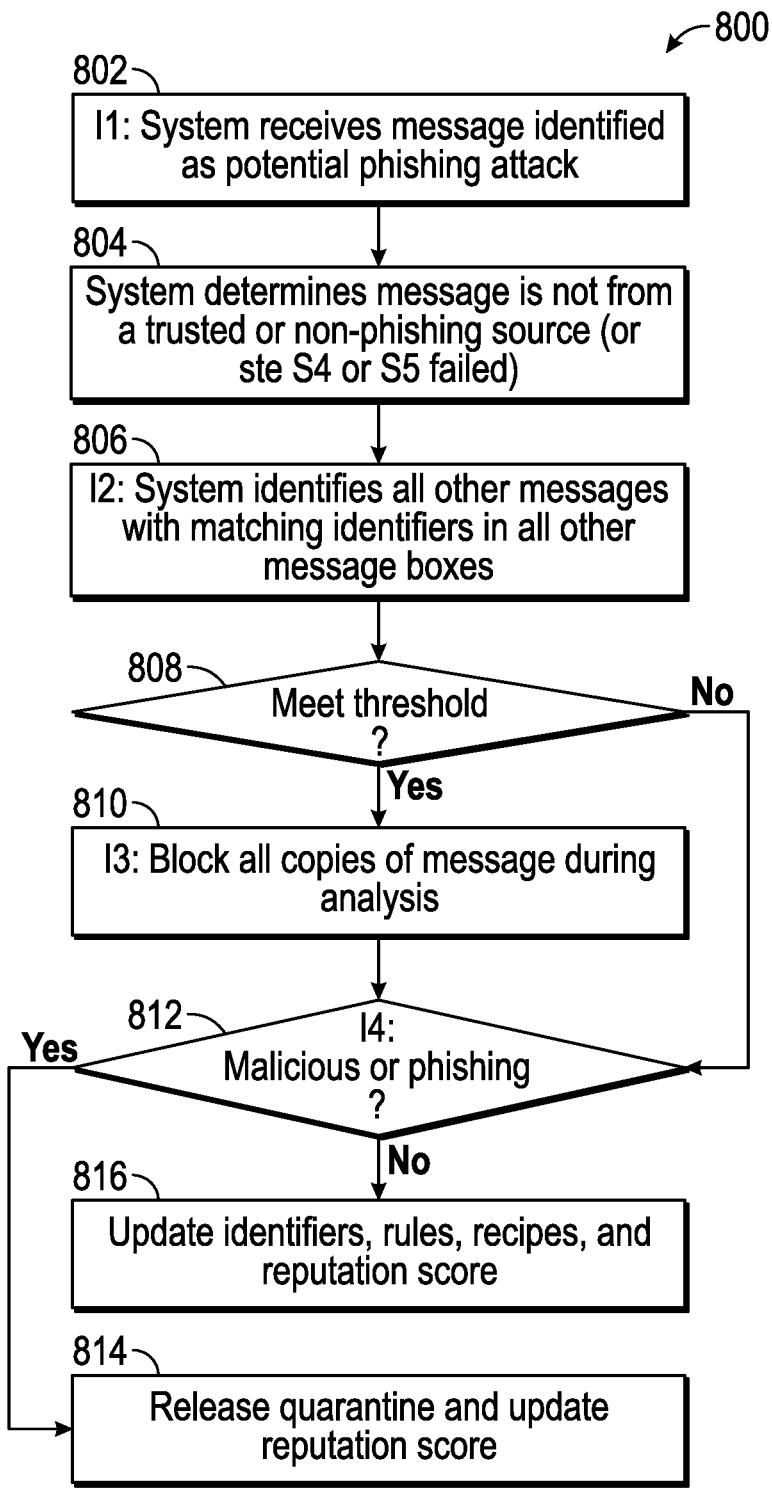
FIG. 8 illustrates an example process for message interdiction.

As discussed above, in some embodiments, the inbound mail server associated with the client (if one is used) may be configured to receive messages. The inbound server can be configured to store a local copy of substantially all of inbound messages, headers and other metadata associated with the messages, or a combination of both. In those embodiments, an interdiction module may be activated to process the incoming reported messages. A flow diagram 800 of an example interdiction module us shown in FIG. 8. Flow diagram 800 proceeds as follows:

In stage 802 (step I1), one or more identifying characteristics of the suspicious message are communicated to the inbound mail server. If the system determines that the message is not from a trusted or non-phishing source (or otherwise fails step S4 or S5 from another flow, e.g. of FIG. 6 or 7), as depicted at stage 804, flow 800 proceeds to stage 806. Otherwise, flow 800 proceeds as in FIG. 6.

In stage 806 (step I2), the inbound mail server can run a search on the existing mail stores and identify matching messages that have been sent to other users.

In a stage 808, the system then determines if the reputation score of the reporter is greater than some threshold. If so, the flow 800 proceeds to stage 810, otherwise flow 800 proceeds to stage 812.

In stage 810 (step I3), the inbound mail sever can generate a command to remove the matching messages from users' inboxes, trash folders, or similar storage, or otherwise render the message inaccessible to the user. In some embodiments, the interdiction module can provide a placeholder message that, if opened, states the message cannot be accessed because it is being analyzed. The system can automatically perform this step upon receiving a notification depending on a user's reputation score or title. Alternatively, the default can be automatic quarantine of all messages unless the reputation score is above a specific threshold value.

In a stage 812 (step I4), if the message is determined to be a non-malicious message, the interdiction module can return access to the messages to the users to whom it was denied during analysis in a stage 814. If, however, the message is determined to be malicious or a phishing attack, the messages can be permanently removed in a stage 816. The database and identifiers for known phishing and malicious messages is also updated. The system can provide a replacement message stating the message has been removed for an appropriate reason, such as it is a phishing message, it contained malicious code, or the message did not conform to workplace appropriate content. Additionally, the reputation score of the reporting user is also updated accordingly depending on the outcome of the message analysis.

The steps above can be performed by the inbound mail server or by a separate computing device in communication with the inbound mail server. The message interdiction module can be located on a client's premises or remotely. The interdiction module can also provide notification to the module responsible for maintaining the reporter reputation scores for individuals of any actions that have been taken by the individuals for the messages that are removed by it. Examples would be notifying the reporting module that the message had been opened, or moved to trash, or not opened. This information can be used by the reputation scoring module to adjust the reputation scores for the individuals according to any actions the individuals have taken.

The interdiction module can have threshold scores which must be met prior to automatic quarantining of messages occurs. Two such thresholds that can be used are sender credibility score and reporter reputation score. If the credibility score of the sender is above a set threshold, or the reporter reputation score is below a threshold (these thresholds can be the same or different values), automatic quarantining of messages is not activated. If, however, either threshold condition is met, messages can be quarantined. Alternatively, combinations of these two scores or other inputs, such as number of users who have reported the message, can be used to determine if automatic quarantining of messages should be effected based upon reporting of a message.

Smart Clustering

Messages can be clustered based on the application of rules to messages that have been reported as suspicious. As non-limiting examples, similarities for grouping purposes could be based on parameters such as message attachment name, time, hash of the attachment, a fuzzy hash, or any combination of parameters. Similarities can be identified based on application of YARA rules to messages. Parameters can be weighted and clusters formed based on weighted parameters. For example, as described above, users have reputation scores and messages can be clustered according to reputational similarity. The reputation score for use in clustering can be a cumulative average. Clustering can also be done according to the reputation or credibility score of a source. In some embodiments, the system can use a plagiarism detection system, n-gram analysis, or comparable system to identify similar phishing stories, flag corresponding messages as suspicious, and cluster messages so identified as embodying a similar phishing story.

Clusters can be defined based on certain parameters, and then messages matching those parameters can be grouped into those clusters. Messages can also be clustered according to recipes matched. Messages may also be clustered according to sender credibility score or reporter (user) reputation score. The reputation score may change each time a message is reported or after analysis of the reported message. The sender credibility score can also change as rules and recipes are created and enacted.

Figure 9:
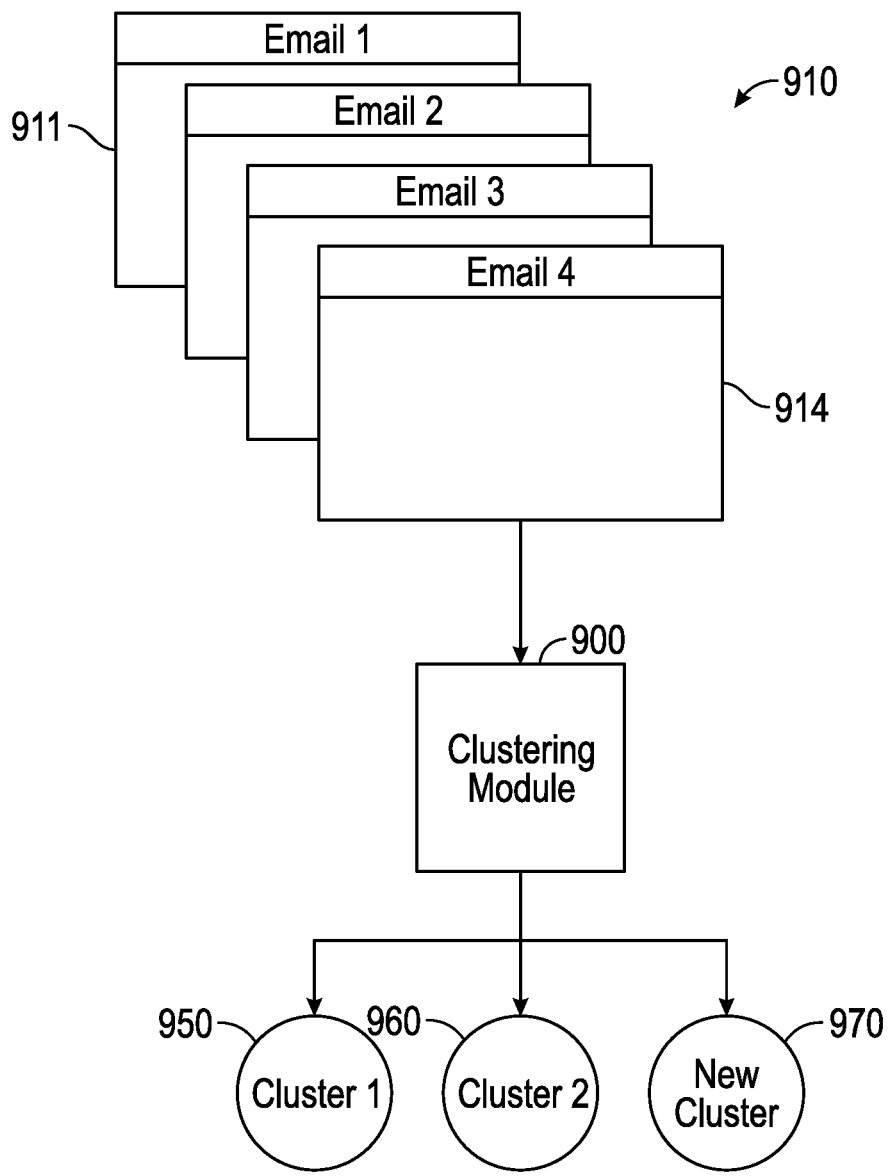
FIG. 9 illustrates an example system process for clustering messages.

An example clustering display is shown in FIG. 9. FIG. 9 shows a cluster module 900 that is capable of performing a cluster operation on incoming messages 910. The cluster module may perform a cluster operation to group similar messages, as described above. For example, one such cluster operation may be based on the average distance of the incoming message to all messages in each cluster, wherein a message may be assigned to at least one cluster if the average distance is below some threshold. To determine distance, each message 910 may be associated with a vector having a finite number dimensions, such that a distance between two messages may be defined as a norm of the difference of the vectors describing each. For example, dimensions of the vector may be associated with any number of rules, such that a binary one or zero is assigned to each dimension if the message matches the rule for that dimension or not. In this respect, the distance between two messages is the number of dissimilar rules between them. Here, two emails are "closer" together by having similar rules associated with each other.

For exemplary purposes, the clustering module 900 shown in FIG. 9 may indicate that message 1 911 should be assigned to cluster 2 960, as the average distance between message 1 911 and all messages assigned to cluster 2 960 is below some threshold. Further, message 1 911 may not be assigned to cluster 1 950, as the average distance to all messages assigned to cluster 1 950 may be above some threshold.

If one of the messages 910 is not sufficiently close to any of the clusters, the clustering module 900 may create a new cluster 970 and assign that message to the new cluster 970. For example, message 4 914 may match a multiple of rules which are not in common with any of the other clusters. The cluster module 900 may then indicate that message 4 914 should be classified under a new cluster 970 and assign message 4 914 to that cluster.

Other clustering techniques contemplated include k-means, deep learning (such as a convolutional neural network), or through various other machine learning techniques, such as natural language processing.

Once formed into clusters, the reported messages can be operated on as a group. The interface can provide any arbitrary functionality on the groups. As a non-limiting example, the cluster of messages can be categorized with a simplified user interface action. For example, the cluster of reported messages may be categorized as non-malicious, spam, advanced threat, crimeware (botnets), or aggregated or averaged reputational scores.

Clusters of messages can be assigned to a category, such as spam, and then re-categorized into a different category. Recategorization can be performed by manual user action by user selection of a cluster of messages and assigning the cluster to a different category. In some embodiments, the application of new or updated rules can cause individual messages or clusters of messages to be automatically recategorized. The responsive action can include re-attaching the original attachment for non-malicious messages. Responsive actions can also include sending a message to all users who have reported messages in that cluster. Some embodiments of the system can include an interface for forwarding a cluster of messages for further processing by one of the integrations, as described below.

Based on the category applied to a cluster of messages, user reputation scores can be updated. For example, if multiple messages are reported as a suspected phishing attack, based on common parameters of those messages, those messages may be clustered. If the messages in the cluster are subsequently determined to be non-malicious, the system can automatically update the reputational scores of the users who have reported the messages as suspicious.

Alerts can be based on clusters. For example, if 10 messages are clustered, and have met a threshold severity or priority, an alert can be generated. Once messages are formed into clusters, the clusters can be sorted based on cluster count. The system can provide an interface for creating a recipe from a cluster.

Information Sharing

The system can be configured to share rules and/or recipes with other installations of the system. In some embodiments, the system can communicate rules and/or recipes created at an installation to a centralized review facility. The centralized review facility can then communicate the rules to any number of other installations. In some cases, the centralized review facility can perform automated or manual quality assurance on the rules before communicating them to other installations.

In some embodiments, each external database can be considered a user. An external database can have trust and/or credibility scores related with it as well, similar to the reporter reputation scores for individuals. This allows the management console module to weigh the input it receives from the individual users from within the organization as well as the information from external sources. A database can have an overall score based upon who owns or runs it, such one run and developed by SANS™ or Norton™ can have a higher score associated with it than one developed by community users.

Some embodiments can include the feature of each entry within one of these external databases having reporter reputation scores developed in the same way as those within an organization. These scores can be combined together, weighted, and be compared to or used in combination with the scores of those individuals who have reported within an organization to determine if a message is malicious or not.

Some embodiments can include an anonymization proxy to enable sharing of rule/recipes anonymously with peer installations. For example, rules can be modified to remove identifying information such as the address of a message or an organization name. Some embodiments can be configured to share the name of the rule author and credit a user for sharing the rule. The performance of users who report and administrators who write successful rules can be tracked, and improvements on rules can be credited. In some embodiments, users may be associated with handles.

Processed Reports Module

The processed reports module allows a user to perform additional analysis on reports which have been processed, as well as gain additional intelligence on threats. In one embodiment, the processed reports module displays all processed reports in a list, or tabular, view having columns representing the date and time the report was processed, the most recent date and time the email was received, the email address of the sender of the email, the subject of the email, the number of IP Addresses found in the email, the number of attachments in the report, the category of the report, the name of the recipe or operator who processed the report, the reporter email address, the reporter reputation score, and the most recent date and time the email was reported. Any of the columns may provide the user with additional functionality. As a non-limiting example, clicking on the subject, number of IP addresses, or number of links may open the report in the message summary. Additionally, clicking on the recipe may open a rule editor. Additionally, hovering over any of the columns may display additional information about the particular entry. As a non-limiting example, hovering over the number of IP addresses can display additional information about the host names to the user, whereas hovering over the number of attachment displays additional information about the attachments.

The list may be sorted by any column. The list may be filtered by the email address of the sender (whether partial or complete), the subject of the email (whether partial or complete), a date range indicating when the email was received, or by one or more categories.

By accessing a report (whether processed or not), a user is able to recategorize the report (e.g. from Crimeware to Spam). When recategorizing the report, the user optionally indicates that the system should send a response to the reporter, as well as a notification to any other group, team, or individual. Once a previously uncategorized report is categorized, the report is considered processed.

The list of processed reports can be filtered and sorted. The system can also export the list of all, selected, or filtered reports. Exporting the reports includes the system producing a file of the reports (such as a CSV file) and providing the file to the user for download.

Integrations

Figure 18:
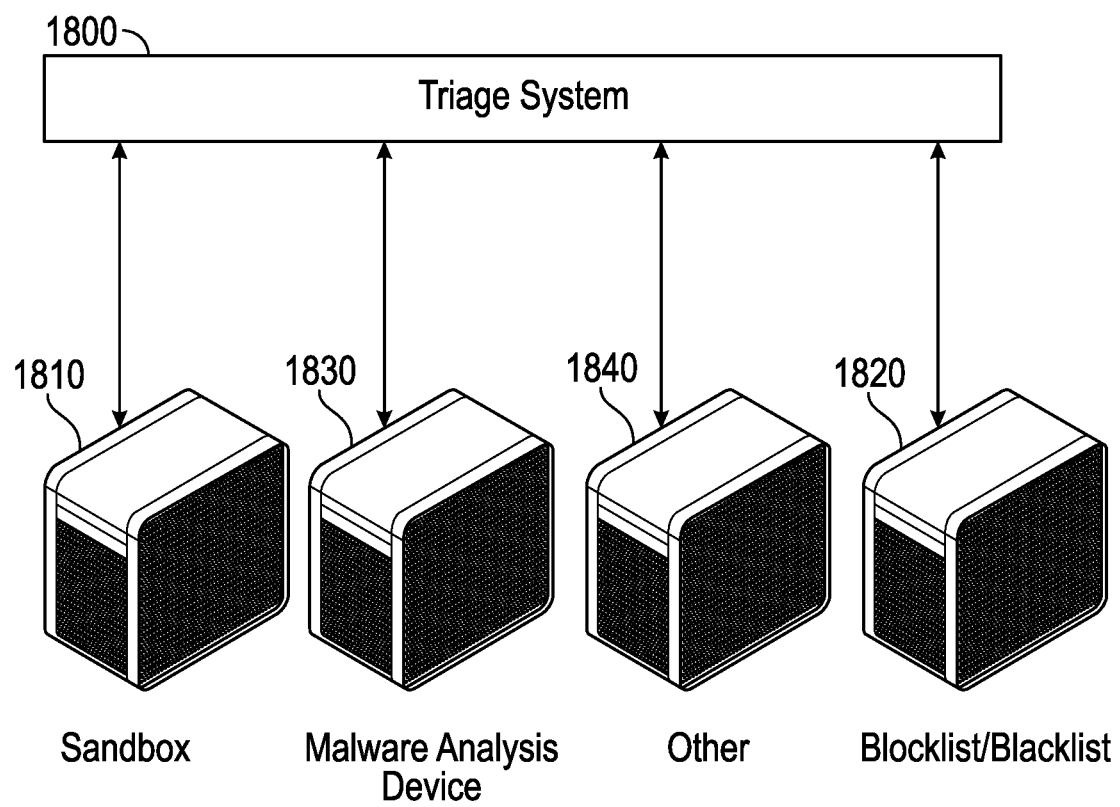
FIG. 18 illustrates various example integrations.

As shown in FIG. 18, the system 1800 may also be configured to forward information about a suspicious message from the management console to other hardware or software configured to take an action to secure a network from a threat derived from the suspicious message. The system can be configured to extract, from the suspicious message, the information and/or parameters to be input to another network security device. In some cases, the rules, described above, can be the inputs, with or without further modification. In some embodiments, the network security device may have an application program interface (API) for receiving rules, parameters, and/or other information on which action could be taken.

In some embodiments, a severity or priority for a message may be assigned, either manually or on the basis of rules, as described above. The severity or priority value can be associated with the threat information and can be input into the integrations. Data derived from collected message threat information can be further provided to a malware analysis device 1830 within the network to address threats at the perimeter, or malware analysis devices in other networks. In some embodiments, the threat information can be automatically provided to the network security device if the threat information is associated with a severity or priority level over a predetermined threshold. The user may specify not to automatically provide some threat information to a third party integration. As a non-limiting example, the user may choose not to automatically send attachments that are PDFs, or otherwise contain personal identifying information (PII). Once the user has determined that there is no PII, the user may manually send the threat information to the malware analysis device.

The threat information derived from messages can be provided, by an API or other means, such as but not limited to an Indicator of Compromise (IOC), to a sandbox 1810, Aresight™, Splunk™, SIEM, or a logging system. As non-limiting examples of the further processing that may be performed by the network security device, sandboxing systems can be used to evaluate artifacts, such as attachments and hashes, domains and URL analysis (sandboxing), and virus data lookups (VirusTotal™). When viewing a reported message that has an attachment, an "Attachments" button can be provided for a user to manually initiate an integration to a sandbox analyzer for detonation, such as one offered by FireEye™ ThreatGrid™, or Cuckoo™, or to a virus or other static malware checking service, such as VirusTotal™, etc. The system also allows a user to perform external lookups of those artifacts against a Web site, for example URL Void or Google, directly from within the system. In addition to a user manually running a third party integration (as detailed above), the user may also specify that the integration is performed automatically. For example, all attachments to a report may be submitted immediately to a sandbox 1810. In another embodiment, the user may specify that only certain types of files are immediately sent to a sandbox 1810. For exemplary purposes, the user may specify that the file type must be any one of DOC, DOCX, XLS, XLSX, PPT, PPTX, PDF, Executable, BZIP, ZIP, TAR, DMG. Additionally, the user may set a data expiration date so that in the event that multiple reports contain the same file, only one file is sent to the third party integration until the expiration time has passed.

The threat information can also be provided to blocklists and/or blacklists 1820. For example, information relating to certain message addresses, IP addresses, and URLs can be provided. As discussed above, phishing attack messages may include a URL and a suggestion to a recipient to access content at that URL. URLs identified using rules, recipes, or by manual identification can be provided to a network security device, such as a firewall, to enable blocking of those URLs. The URLs may also be provided to a third party integration for URL analysis. As a non-limiting example, OpenDNS may be integrated with the system to provide URL analysis. In addition to submitting the URL manually to the third party integration, the user can configure the system to submit any URLs in a report to a third party integration automatically.

As with other integrations, the system allows a user to designate whether or not URLs contained in the report are automatically sent to a third party integration or not. A user may always manually submit or resubmit a URL to a third party integration. The system then uses the response from the third party URL analysis to determine a threat score. Scores are indicated to a user in the Integration Results column of the administrator inbox or administrator recon box, or within a message summary. Results are color coded to provide the user with quick information. A yellow icon indicates that the URL analysis indicated that the URL is suspicious. A red icon indicates that the URL is malicious.

In some embodiments, no icon may be provided where there is no threat associated with the result.

The system 1800 may export report data to a syslog receiver. As a non-limiting example, the syslog receiver may be LogRhythm. When a report is categorized as Crimeware or Advanced Threat, the system generates an event that can be sent to a syslog receiver. The event contains a URL of the report so that a user may access the report within the system. Events may then be imported into Security Information and Event Management (SIEM) platforms, incident management systems, ticketing systems, or any of various other logging systems capable of monitoring, managing, and responding to events.

In one embodiment, these events are in Common Event Format (CEF) syntax. In such a syntax, each event has two main components, the header and the extension. Information contained within the header may be specified by multiple values separated by a character, such as a pipe "|". Additional information is indicated by the position in the header. For exemplary purposes, the first value may indicate the CEF protocol version, the second value may indicate the device vendor, the third value may indicate the device name, the fourth position may indicate the device version, the fifth value may indicate a unique signature id (e.g. a 1 for a report categorized by a recipe and a 2 for a report categorized by a user), the sixth value may indicate the name of the event, and the seventh value may indicate the severity of the report. The extension may provide additional information by one or more key-value pairs. As non-limiting examples, key-value pairs represent information such as a date and time the message was processed, a date and time the suspicious message was received by the reporter, a date and time the message was reported, a label for the date and time the message was reported, an email address of the reporter, category, a name of the recipe, a label for the recipe, the highest priority number of any rule associated with the report, a label for the highest priority rule, the name of the highest priority rule matched, a full URL of the report, and a label for the full URL of the report.

The system 1800 may provide message data to other integrations 1840, as well. For example, other integrations 1840 may include machine learning and/or natural language processing APIs. Furthermore, other integrations 1840 may also include querying a service for the latest known security threats. Combined, the other integrations 1840 may characterize a reported email as "good" or "bad", i.e. determine with some probabilistic determination whether the reported email is generally malicious or non-malicious to aid an administrator in responding to threats. Alternatively, the characterization of a message as "good" or "bad" may cause the system to automatically perform some action on the message (e.g., quarantine), or otherwise automate the functions of the administrator.

Results from the integrations may be displayed in the administrator inbox (or administrator recon box) in another column as Integration Results. The Integration Results column may provide a quick visual indication to the user about the result. For example, if the system determines that the information is suspicious, a yellow icon is displayed. Alternatively, if the system determines that the information is malicious, a red icon is displayed. If no threat is found, the system may not display any icon, or other indication. Hovering over the icon will display a summary of the integration analysis for all URLs or attachments. Clicking on the item will provide the user with additional functions. As non-limiting examples, the user is displayed options of viewing the results of the third party integration, manually submitting the item to the third party integration, and resubmitting the item to the third party integration. Similar to the Integration Results displayed in the administrator inbox (or administrator recon box), icon information indicating the integration result of an attachment, hash of an attachment, or URL is displayed to the user in a message summary, such as through the link option (such as link option 1224 of FIG. 12) or through the attachment option (such as attachment option 1225 of FIG. 12). Integration Results may also be displayed in the cluster summary.

Example Process Flow and User Analysis

Figure 19:
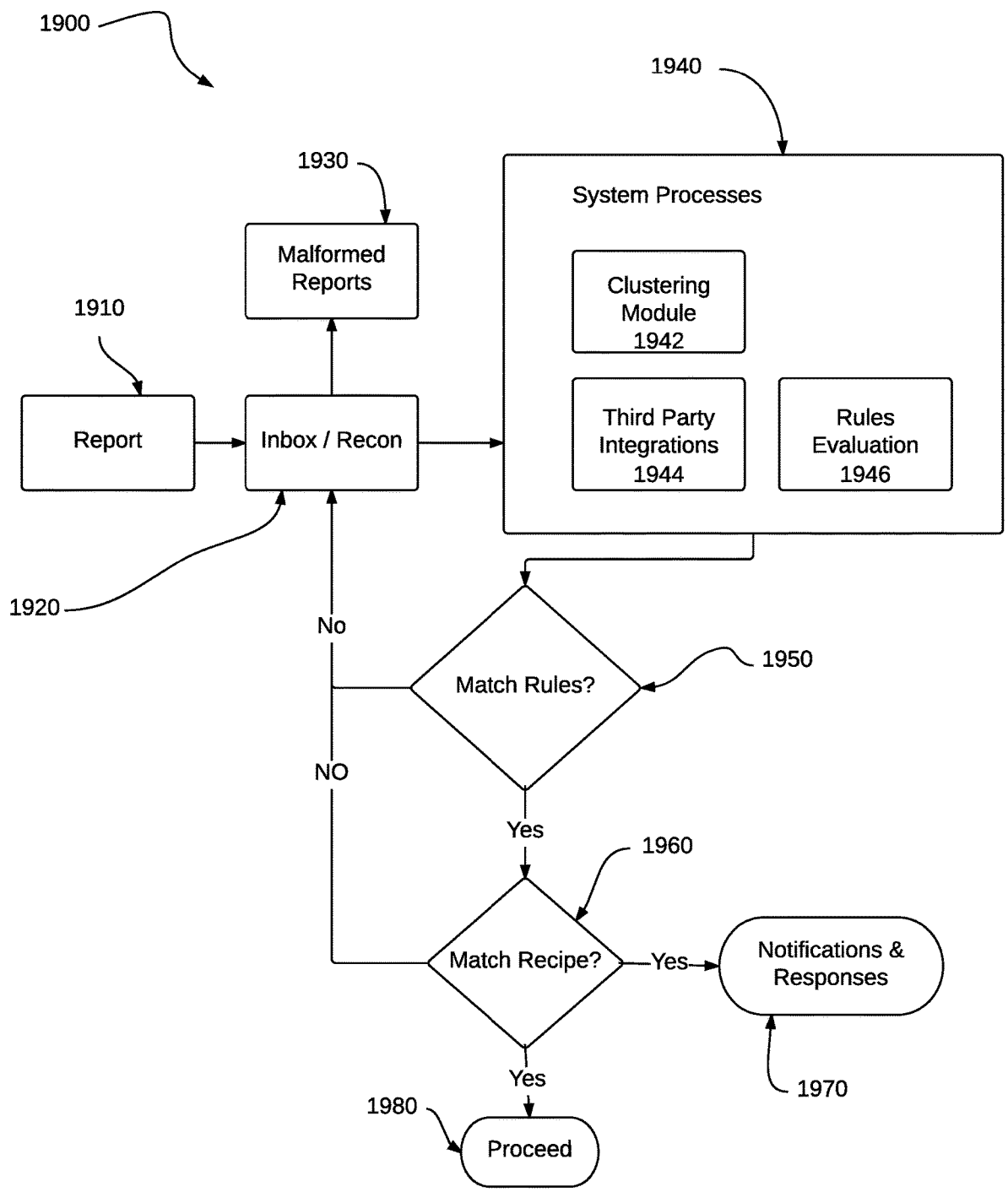
FIG. 19 illustrates an example system overview.

A system process 1900 is depicted in FIG. 19, which illustrates a brief overview of one embodiment of the system. After a report 1910 is generated, it is sent to the system Inbox/Recon Box 1920. The report 1910 is then subjected to various system processes 1940. System processes 1940 include a clustering module 1942 to determine if the report should be considered as part of any cluster, any third party integrations 1944 configured to be automatically run on incoming reports, as well as rule evaluation 1946 to determine any and all rules which match the incoming report 1910. In a rule matching step 1950, the system determines if any rules match the report 1910. If no rules match, the report 1910 is returned to the Inbox/Recon Box 1920. If the report does match any rules, results of the system processes 1940 are forwarded to a recipe matching step 1960. In the recipe matching step 1960, if no recipes are matches (i.e. the report 1910 is not categorized), the report 1910 is returned to the Inbox/Recon Box 1920. Otherwise, any notifications and responses 1970 indicated by the matching recipe are sent and the system process 1900 continues to other operations.

Figure 20:
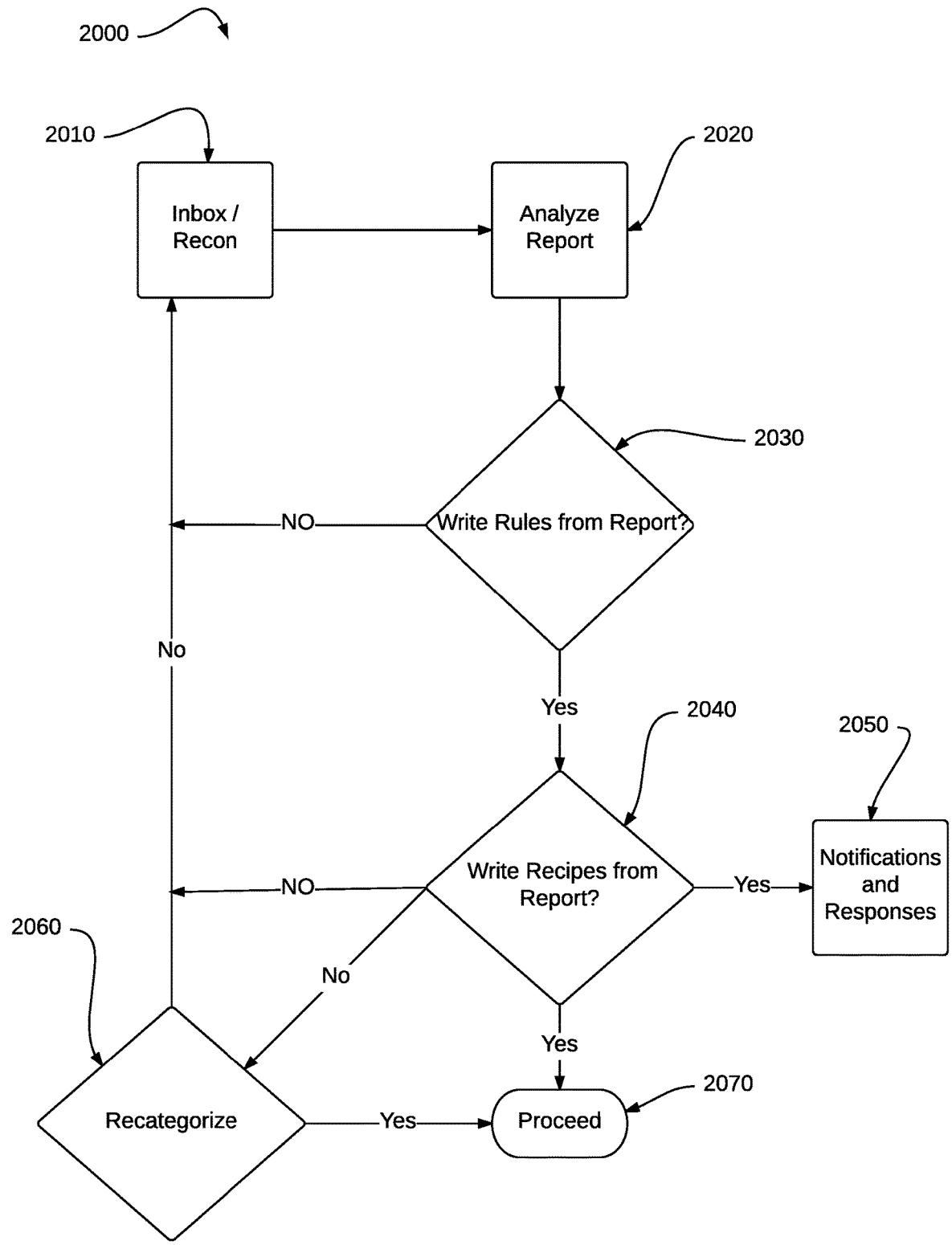
FIG. 20 illustrates an example user analysis.

FIG. 20, in turn, illustrates a process 2000 of how a user might interact with the system. A user first accesses the Inbox/Recon Box 2010, which maintains all uncategorized reports. Opening a specific report, as described above, allows the user to analyze the report in step 2020. Once the report is open, the user may decide to generate a rule based on the report in step 2030. If a rule is created in step 2030, the user may also create a recipe from the report in step 2040. If a recipe is created, the system will optionally send out notifications and responses designated by the user in step 2050 and proceed to other operations in step 2070. If no rules or no recipes are generated, the user may decide to manually recategorize the report in step 2060. If the report is recategorized, the system will proceed to other operations in step 2070. Otherwise, the report is returned to the Inbox/Recon Box 2010.

System Architectures

The systems and methods described herein can be implemented in software or hardware or any combination thereof. The systems and methods described herein can be implemented using one or more computing devices which may or may not be physically or logically separate from each other. The methods may be performed by components arranged as either on-premise hardware, on premise virtual systems, or hosted-private instances. Additionally, various aspects of the methods described herein may be combined or merged into other functions. Example computerized systems for implementing the invention is illustrated in FIGS. 1-3. A processor or computer system can be configured to particularly perform some or all of the method described herein. In some embodiments, the method can be partially or fully automated by one or more computers or processors. The invention may be implemented using a combination of any of hardware, firmware and/or software. The present invention (or any part(s) or function(s) thereof) may be implemented using hardware, software, firmware, or a combination thereof and may be implemented in one or more computer systems or other processing systems. In some embodiments, the illustrated system elements could be combined into a single hardware device or separated into multiple hardware devices. If multiple hardware devices are used, the hardware devices could be physically located proximate to or remotely from each other. The embodiments of the methods described and illustrated are intended to be illustrative and not to be limiting. For example, some or all of the steps of the methods can be combined, rearranged, and/or omitted in different embodiments.

In one exemplary embodiment, the invention may be directed toward one or more computer systems capable of carrying out the functionality described herein. Example computing devices may be, but are not limited to, a personal computer (PC) system running any operating system such as, but not limited to, Microsoft™ Windows™. However, the invention may not be limited to these platforms. Instead, the invention may be implemented on any appropriate computer system running any appropriate operating system. Other components of the invention, such as, but not limited to, a computing device, a communications device, mobile phone, a telephony device, a telephone, a personal digital assistant (PDA), a personal computer (PC), a handheld PC, an interactive television (iTV), a digital video recorder (DVD), client workstations, thin clients, thick clients, proxy servers, network communication servers, remote access devices, client computers, server computers, routers, web servers, data, media, audio, video, telephony or streaming technology servers, etc., may also be implemented using a computing device. Services may be provided on demand using, e.g., but not limited to, an interactive television (iTV), a video on demand system (VOD), and via a digital video recorder (DVR), or other on demand viewing system.

The system may include one or more processors. The processor(s) may be connected to a communication infrastructure, such as but not limited to, a communications bus, cross-over bar, or network, etc. The processes and processors need not be located at the same physical locations. In other words, processes can be executed at one or more geographically distant processors, over for example, a LAN or WAN connection. Computing devices may include a display interface that may forward graphics, text, and other data from the communication infrastructure for display on a display unit.

The computer system may also include, but is not limited to, a main memory, random access memory (RAM), and a secondary memory, etc. The secondary memory may include, for example, a hard disk drive and/or a removable storage drive, such as a compact disk drive CD-ROM, etc. The removable storage drive may read from and/or write to a removable storage unit. As may be appreciated, the removable storage unit may include a computer usable storage medium having stored therein computer software and/or data. In some embodiments, a machine-accessible medium may refer to any storage device used for storing data accessible by a computer. Examples of a machine-accessible medium may include, e.g., but not limited to: a magnetic hard disk; a floppy disk; an optical disk, like a compact disk read-only memory (CD-ROM) or a digital versatile disk (DVD); a magnetic tape; and/or a memory chip, etc.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

The processing system can be in communication with a computerized data storage system. The data storage system can include a non-relational or relational data store, such as a MySQL™ or other relational database. Other physical and logical database types could be used. The data store may be a database server, such as Microsoft SQL Server™, Oracle™, IBM DB2™, SQLITE™, or any other database software, relational or otherwise. The data store may store the information identifying syntactical tags and any information required to operate on syntactical tags. In some embodiments, the processing system may use object-oriented programming and may store data in objects. In these embodiments, the processing system may use an object-relational mapper (ORM) to store the data objects in a relational database. The systems and methods described herein can be implemented using any number of physical data models. In one example embodiment, an RDBMS can be used. In those embodiments, tables in the RDBMS can include columns that represent coordinates. In the case of economic systems, data representing companies, products, etc. can be stored in tables in the RDBMS. The tables can have pre-defined relationships between them. The tables can also have adjuncts associated with the coordinates.

In alternative exemplary embodiments, secondary memory may include other similar devices for allowing computer programs or other instructions to be loaded into computer system. Such devices may include, for example, a removable storage unit and an interface. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units and interfaces, which may allow software and data to be transferred from the removable storage unit to computer system.

The computing device may also include an input device such as but not limited to, a mouse or other pointing device such as a digitizer, and a keyboard or other data entry device (not shown). The computing device may also include output devices, such as but not limited to, a display, and a display interface. Computer may include input/output (I/O) devices such as but not limited to a communications interface, cable and communications path, etc. These devices may include, but are not limited to, a network interface card, and modems. Communications interface may allow software and data to be transferred between computer system and external devices.

In one or more embodiments, the present embodiments are practiced in the environment of a computer network or networks. The network can include a private network, or a public network (for example the Internet, as described below), or a combination of both. The network includes hardware, software, or a combination of both.

From a telecommunications-oriented view, the network can be described as a set of hardware nodes interconnected by a communications facility, with one or more processes (hardware, software, or a combination thereof) functioning at each such node. The processes can inter-communicate and exchange information with one another via communication pathways between them using interprocess communication pathways. On these pathways, appropriate communications protocols are used.

An exemplary computer and/or telecommunications network environment in accordance with the present embodiments may include nodes, which may include hardware, software, or a combination of hardware and software. The nodes may be interconnected via a communications network. Each node may include one or more processes, executable by processors incorporated into the nodes. A single process may be run by multiple processors, or multiple processes may be run by a single processor, for example. Additionally, each of the nodes may provide an interface point between network and the outside world, and may incorporate a collection of sub-networks.

In an exemplary embodiment, the processes may communicate with one another through interprocess communication pathways supporting communication through any communications protocol. The pathways may function in sequence or in parallel, continuously or intermittently. The pathways can use any of the communications standards, protocols or technologies, described herein with respect to a communications network, in addition to standard parallel instruction sets used by many computers.

The nodes may include any entities capable of performing processing functions. Examples of such nodes that can be used with the embodiments include computers (such as personal computers, workstations, servers, or mainframes), handheld wireless devices and wireline devices (such as personal digital assistants (PDAs), modem cell phones with processing capability, wireless email devices including BlackBerry™ devices), document processing devices (such as scanners, printers, facsimile machines, or multifunction document machines), or complex entities (such as local-area networks or wide area networks) to which are connected a collection of processors, as described. For example, in the context of the present invention, a node itself can be a wide-area network (WAN), a local-area network (LAN), a private network (such as a Virtual Private Network (VPN)), or collection of networks.

Communications between the nodes may be made possible by a communications network. A node may be connected either continuously or intermittently with communications network. As an example, in the context of the present invention, a communications network can be a digital communications infrastructure providing adequate bandwidth and information security.

The communications network can include wireline communications capability, wireless communications capability, or a combination of both, at any frequencies, using any type of standard, protocol or technology. In addition, in the present embodiments, the communications network can be a private network (for example, a VPN) or a public network (for example, the Internet).

A non-inclusive list of exemplary wireless protocols and technologies used by a communications network may include BlueTooth™, general packet radio service (GPRS), cellular digital packet data (CDPD), mobile solutions platform (MSP), multimedia messaging (MMS), wireless application protocol (WAP), code division multiple access (CDMA), short message service (SMS), wireless markup language (WML), handheld device markup language (HDML), binary runtime environment for wireless (BREW), radio access network (RAN), and packet switched core networks (PS-CN). Also included are various generation wireless technologies. An exemplary non-inclusive list of primarily wireline protocols and technologies used by a communications network includes asynchronous transfer mode (ATM), enhanced interior gateway routing protocol (EIGRP), frame relay (FR), high-level data link control (HDLC), Internet control message protocol (ICMP), interior gateway routing protocol (IGRP), internetwork packet exchange (IPX), ISDN, point-to-point protocol (PPP), transmission control protocol/internet protocol (TCP/IP), routing information protocol (RIP) and user datagram protocol (UDP). As skilled persons will recognize, any other known or anticipated wireless or wireline protocols and technologies can be used.

Embodiments of the present invention may include apparatuses for performing the operations herein. An apparatus may be specially constructed for the desired purposes, or it may comprise a general purpose device selectively activated or reconfigured by a program stored in the device.

In one or more embodiments, the present embodiments are embodied in machine-executable instructions. The instructions can be used to cause a processing device, for example a general-purpose or special-purpose processor, which is programmed with the instructions, to perform the steps of the present invention. Alternatively, the steps of the present invention can be performed by specific hardware components that contain hardwired logic for performing the steps, or by any combination of programmed computer components and custom hardware components. For example, the present invention can be provided as a computer program product, as outlined above. In this environment, the embodiments can include a machine-readable medium having instructions stored on it. The instructions can be used to program any processor or processors (or other electronic devices) to perform a process or method according to the present exemplary embodiments. In addition, the present invention can also be downloaded and stored on a computer program product. Here, the program can be transferred from a remote computer (e.g., a server) to a requesting computer (e.g., a client) by way of data signals embodied in a carrier wave or other propagation medium via a communication link (e.g., a modem or network connection) and ultimately such signals may be stored on the computer systems for subsequent execution).

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user, the features can be implemented on a computer with a display device, such as an LCD (liquid crystal display), or another type of monitor for displaying information to the user, and a keyboard and an input device, such as a mouse or trackball by which the user can provide input to the computer.

A computer program can be a set of instructions that can be used, directly or indirectly, in a computer. The systems and methods described herein can be implemented using programming languages such as Flash™, JAVA™, C++, C, C#, Python, Visual Basic™, JavaScript™ PHP, XML, HTML, etc., or a combination of programming languages, including compiled or interpreted languages, and can be deployed in any form, including as a stand-alone program or as a module, component, subroutine, or other unit suitable for use in a computing environment. The software can include, but is not limited to, firmware, resident software, microcode, etc. Protocols such as SOAP/HTTP may be used in implementing interfaces between programming modules. The components and functionality described herein may be implemented on any desktop operating system executing in a virtualized or non-virtualized environment, using any programming language suitable for software development, including, but not limited to, different versions of Microsoft Windows™, Apple™ Mac™, iOS™, Unix™/X-Windows™, Linux™ etc. The system could be implemented using a web application framework, such as Ruby on Rails.

Suitable processors for the execution of a program of instructions include, but are not limited to, general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The systems, modules, and methods described herein can be implemented using any combination of software or hardware elements. The systems, modules, and methods described herein can be implemented using one or more virtual machines operating alone or in combination with one other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks that form the Internet.

One or more embodiments of the invention may be practiced with other computer system configurations, including hand-held devices, microprocessor systems, microprocessor-based or programmable consumer electronics, minicomputers, mainframe computers, etc. The invention may also be practiced in distributed computing environments where tasks are performed by remote processing devices that are linked through a network.

The terms "computer program medium" and "computer readable medium" may be used to generally refer to media such as but not limited to removable storage drive, a hard disk installed in hard disk drive. These computer program products may provide software to computer system. The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the description and claims, the terms "coupled" and "connected," along with their derivatives, may be used. It should be understood that these terms may be not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm may be here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, it may be appreciated that throughout the specification terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently.

While one or more embodiments of the invention have been described, various alterations, additions, permutations and equivalents thereof are included within the scope of the invention.

In the description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

What is claimed is:

1. A computerized method for suspicious message processing and incident response, comprising:
   providing, via a device, computer-executable instructions for a messaging client, and
   providing computer-executable instructions for a threat detection platform,
   wherein the computer-executable instructions for the messaging client comprise computer-executable instructions for:
      receiving a user interface action by a user indicating that a message delivered in an account associated with an individual has been identified by the user as a potential security threat;
      determining whether the delivered message is a known simulated phishing attack based on an identifier or other message characteristic of the delivered message;
      if the delivered message is determined to be a known simulated phishing attack based upon the identifier or other message characteristic of the delivered message, then providing a graphically displayed feedback confirming that the delivered message was a simulated phishing attack; and
      if the delivered message is determined not to be a known simulated phishing attack based upon the identifier or other message characteristic of the delivered message, then transmitting a copy of the delivered message to the threat detection platform; and
   wherein the computer-executable instructions for the threat detection platform comprise computer-executable instructions for:
      receiving the transmitted copy of the message at the threat detection platform;
      electronically storing a pattern as a rule for determining whether a body of the received message or an attachment of the received message contains a defined textual or binary pattern associated with a security threat;
      processing the received message according to the electronically stored rule to determine whether the body of the received message or an attachment of the received message contains the defined textual or binary pattern associated with the security threat;
      further processing the received message if the received message is determined to contain the defined textual or binary pattern;
      associating the received message with a message group, the message group being defined by having at least the defined textual or binary pattern in common with the received message; and
      displaying a graphical representation of the message group, each of the group of messages displayed having been determined not to be a known simulated phishing attack based on the identifier or other message characteristic of the delivered message.

2. The method of claim 1, further comprising enabling access to a message server for removing messages from messaging accounts associated with multiple users.

3. The method of claim 2, further comprising generating a command to remove the received message from a user inbox.

4. The method of claim 1, further comprising removing one or more messages from messaging accounts associated with multiple users based on a matching of at least a portion of header information of the delivered message or at least a portion of metadata of the delivered message with the one or more messages from the messaging accounts associated with the multiple users.

5. The method of claim 1, further comprising executing a remedial action on a network device based on the comparison of the delivered message against stored rules for determining whether message or attachment data contains a pre-defined textual or a pre-defined binary pattern.

6. The method of claim 1, further comprising configuring an inbound mail sever to generate a command to remove one or more messages to render the delivered message inaccessible to the user.

7. The method of claim 1, further comprising performing an operation on one or more messages in the message group, wherein the operation comprises one of deleting the message from a user inbox, quarantining the message from a user inbox, classifying the message, and responding to the message.

8. The method of claim 1, wherein each message group is displayed as an active link which, when selected, displays additional information about the selected message group.

9. The method of claim 1, wherein the delivered message is classified as malicious if the delivered message is assigned to a message group having a threshold number of messages.

10. The method of claim 1, wherein the delivered message is classified as non-malicious based on a determination that the message group to which the delivered message is assigned is non-malicious.

11. The method of claim 1, further comprising executing an integration, wherein the integration comprises one or more of opening a link contained in the delivered message data in a simulated environment, opening attachment data in a simulated environment, and scanning the delivered message for malicious content, and querying a database of known threat activity with data extracted from the delivered message.

12. The method of claim 1, wherein at least a portion of a message body of the delivered message or at least a portion of header information of the delivered message or at least a portion of metadata of the delivered message is communicated for threat processing.

13. The method of claim 1, further comprising providing an interface for creating a set of executable instructions based on at least one characteristic of at least one message from a corresponding message group.

14. The method of claim 1, further comprising providing an interface for specifying one or more rules for automatically responding to a notification by a pre-configured response message.

15. The method of claim 1, further comprising:
   labeling as suspicious messages that are not cleared by initial rules pattern matching processing; and grouping the messages labeled as suspicious in a group of suspicious messages.

16. The method of claim 1, further comprising automatically responding to a user with a message indicating that the delivered message is legitimate, and removing the delivered message from display in a management console.

17. The method of claim 1, wherein the at least one characteristic in common with the delivered message includes a domain of a Uniform Resource Locator in the body of the received message or a hash of an attachment to received message.

18. A computerized system for suspicious message processing and incident response, comprising:
a hardware processor configured for executing instructions at a messaging client, the computer-executable instructions for:
receiving a user interface action by a user indicating that a message delivered in an account associated with an individual has been identified by the user as a potential security threat;
determining whether the delivered message is a known simulated phishing attack based on an identifier or other message characteristic of the delivered message;
if the delivered message is determined to be a known simulated phishing attack based upon the identifier or other message characteristic of the delivered message, then providing a graphical feedback confirming that the delivered message was a simulated phishing attack; and
if the delivered message is determined not to be a known simulated phishing attack based upon the identifier or other message characteristic of the delivered message, then transmitting a copy of the delivered message to a threat detection platform;
a processor configured for executing instructions at the threat detection platform, the computer-executable instructions for:
receiving the transmitted copy of the message at the threat detection platform;
electronically storing a pattern as a rule for determining whether a body of the received message or an attachment of the received message contains a defined textual or binary pattern associated with a security threat;
processing the received message according to the electronically stored rule to determine whether the body of the received message or an attachment of the received message contains the defined textual or binary pattern associated with a security threat;
further processing the received message if the received message is determined to contain the defined textual or binary pattern;
associating the received message with a message group, the group being defined by having at least the defined textual or binary pattern in common with the received message; and
displaying a graphical representation of the message group, each of the group of messages displayed having been determined not to be a known simulated phishing attack based on the identifier or other message characteristic of the delivered message.

19. The system of claim 18, further comprising enabling access to a message server for removing messages from messaging accounts associated with multiple users.

20. The system of claim 19, further comprising generating a command to remove the received message from a user inbox.

21. The system of claim 18, further comprising removing one or more messages from messaging accounts associated with multiple users based on a matching of at least a portion of header information of the delivered message or at least a portion of metadata of the delivered message with the one or more messages from the messaging accounts associated with the multiple users.

22. The system of claim 18, further comprising executing a remedial action on a network device based on the comparison of the delivered message against stored rules for determining whether message or attachment data contains a pre-defined textual or a pre-defined binary pattern.

23. The system of claim 18, further comprising configuring an inbound mail sever to generate a command to remove one or more messages to render the delivered message inaccessible to the user.

24. The system of claim 18, further comprising performing an operation on one or more messages in the message group, wherein the operation comprises one of deleting the message from a user inbox, quarantining the message from a user inbox, classifying the message, and responding to the message.

25. The system of claim 18, wherein each message group is displayed as an active link which, when selected, displays additional information about the selected message group.

26. The system of claim 18, wherein the delivered message is classified as malicious if the delivered message is assigned to a message group having a threshold number of messages.

27. The system of claim 18, wherein the delivered message is classified as non-malicious based on a determination that the message group to which the delivered message is assigned is non-malicious.

28. The system of claim 18, further comprising executing an integration, wherein the integration comprises one or more of opening a link contained in the delivered message data in a simulated environment, opening attachment data in a simulated environment, and scanning the delivered message for malicious content, and querying a database of known threat activity with data extracted from the delivered message.

29. The system of claim 18, wherein at least a portion of a message body of the delivered message or at least a portion of header information of the delivered message or at least a portion of metadata of the delivered message is communicated for threat processing.

* * * * *